(12) United States Patent
Tajima

(10) Patent No.: US 7,477,803 B2
(45) Date of Patent: Jan. 13, 2009

(54) IMAGE PROCESSING APPARATUS

(75) Inventor: Kaori Tajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 10/938,084

(22) Filed: Sep. 10, 2004

(65) Prior Publication Data
US 2005/0058361 A1  Mar. 17, 2005

(30) Foreign Application Priority Data

Sep. 12, 2003  (JP)  ............................ 2003-321421
Sep. 12, 2003  (JP)  ............................ 2003-321422

(51) Int. Cl.
*G06K 9/32* (2006.01)
(52) U.S. Cl. ...................... 382/300; 382/278
(58) Field of Classification Search ................. 382/278, 382/107; 348/273, 243
See application file for complete search history.

(56) References Cited

U.S. PATENT DOCUMENTS

| | | | |
|---|---|---|---|
| 5,382,976 A | | 1/1995 | Hibbard |
| 5,629,734 A | * | 5/1997 | Hamilton et al. .......... 348/222.1 |
| 5,764,786 A | * | 6/1998 | Kuwashima et al. ......... 382/107 |
| 6,091,862 A | * | 7/2000 | Okisu .......................... 382/300 |
| 6,295,087 B1 | | 9/2001 | Nohda |
| 7,053,944 B1 | * | 5/2006 | Acharya et al. .............. 348/273 |

FOREIGN PATENT DOCUMENTS

JP  10-150668  6/1998

* cited by examiner

*Primary Examiner*—Jingge Wu
*Assistant Examiner*—Tsung-Yin Tsai
(74) *Attorney, Agent, or Firm*—Canon U.S.A. Inc., I.P. Division

(57) ABSTRACT

An image processing system has an input unit for inputting an image signal obtained with offset sampling per pixel, a correlation detecting unit for, based on the input image signal, producing a coefficient depending on an arbitrary direction in which correlation between a plurality of pixels near a target pixel to be interpolated is high, and an interpolation circuit for producing an interpolation image signal in accordance with the coefficient produced by the correlation detecting unit, and interpolating the image signal input from the input unit by using the interpolation image signal.

4 Claims, 31 Drawing Sheets

FIG. 7

|  |  | $P_{-2V}$ |  |  |
|---|---|---|---|---|
|  |  | $P_{-1V}$ |  |  |
| $P_{-2H}$ | $P_{-1H}$ | $P_0$ | $P_{+1H}$ | $P_{+2H}$ |
|  |  | $P_{+1V}$ |  |  |
|  |  | $P_{+2V}$ |  |  |

Hnq : HORIZONTAL NYQUIST FREQUENCY
Vnq : VERTICAL NYQUIST FREQUENCY

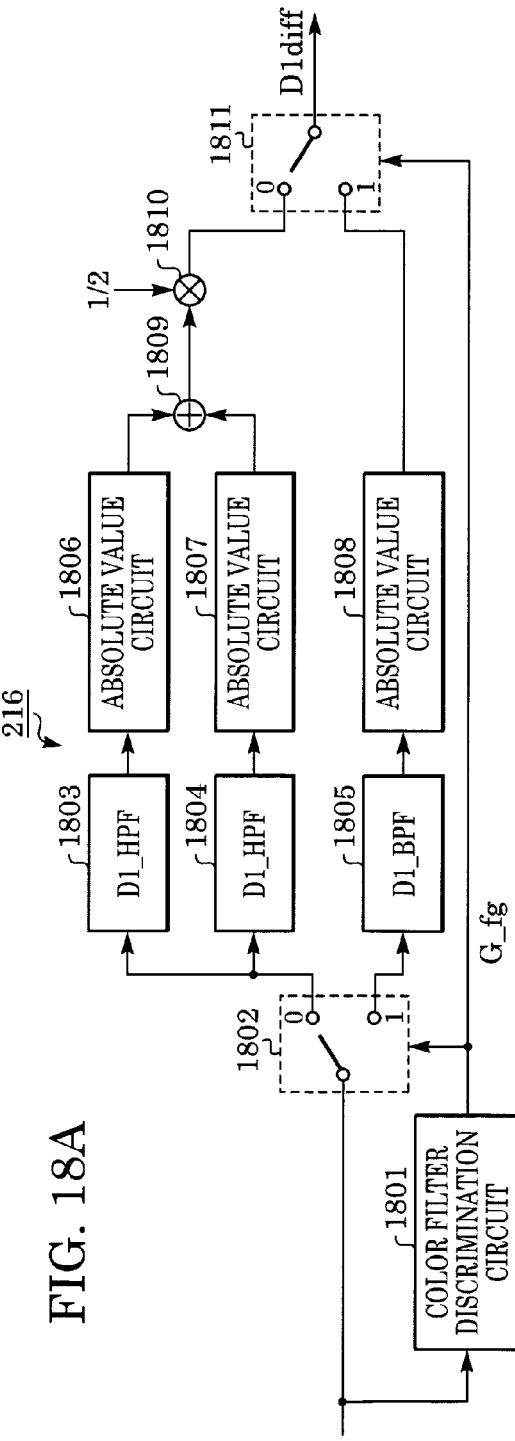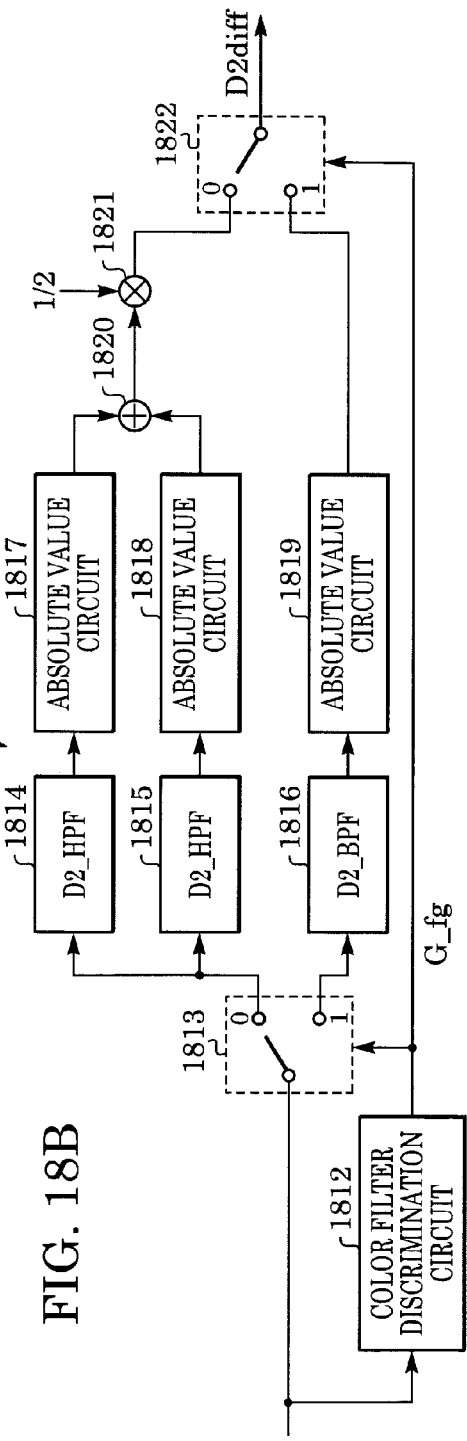

FIG. 19A

| G11 |     | G13 |
|-----|-----|-----|
|     | G22 |     |
| G31 |     | G33 |

FIG. 19B

| G11 |     | G13 |
|-----|-----|-----|
|     | G22 |     |
| G31 |     | G33 |

FIG. 19C

| G11 | G12 | G13 |
|-----|-----|-----|
| G21 | G22 | G23 |
| G31 | G32 | G33 |

• SAMPLING FREQUENCY
○ NYQUIST FREQUENCY
▦ INTERPOLATION FILTER PASS BAND

IMAGE PROCESSING APPARATUS

CROSS REFERENCED TO RELATED APPLICATIONS

This application claims priority from Japanese Patent Application No. 2003-321421 and 2003-321422 filed Sep. 12, 2003, which is hereby incorporated by reference herein.

BACKGROUND OF THE INVENTION

1. Field of the Invention

The present invention relates to an image processing apparatus, and more particularly to an interpolation process for sampled image signals.

2. Description of the Related Art

Digital still cameras and video cameras have become quite popular among consumers. These cameras typically have image pick up devices that employ a color filter system known as the primary-color Bayer array.

As shown in FIG. 24, the Bayer array is patterned such that each pixel has an R, G, or B color value. To obtain other color values for each pixel, an interpolation process using nearby pixels having the desired color value is required. For example, a G value can be obtained for a B pixel by interpolating G pixels around the B pixel. Such an interpolation process is generally called a simultaneous interpolation process.

When simultaneous interpolation of G signals is performed, a frequency spectrum shown in FIG. 25 is produced because the G signals are subjected to offset sampling as shown in FIG. 27.

For these G signals, aliasing occurs at the sampling frequency positions (indicated by a mark ●). A reproducible frequency domain is then produced. This frequency domain is a rhombic-shaped region, the periphery of which is defined by Nyquist frequency positions (indicated by a mark ○).

Accordingly, when the simultaneous interpolation process is generally performed by cascading vertical and horizontal low-pass filters, interpolation optimum for such a rhombic frequency domain cannot be achieved, thus resulting in a deterioration of image quality.

More specifically, when the interpolation is uniformly performed by using an interpolation filter that allows passage of signals in bands lower than a vertical Nyquist frequency Vnq and a horizontal Nyquist frequency Hnq. As shown in FIG. 26A, image quality near points Dnq deteriorates due to turn-back signals about points Dfs.

Also, when the interpolation is uniformly performed by using an interpolation filter that allows passage of signals in bands within a quadrilateral region, which is defined by connecting the points Dnq, as shown in FIG. 26B, higher-band signals near the horizontal Nyquist frequency Hnq and the vertical Nyquist frequency Vnq disappear, thus resulting in a blurred image.

To eliminate those adverse effects on image quality caused when uniformly interpolating the entirety of an image by an interpolation filter having a single characteristic, U.S. Pat. No. 5,382,976 ('976 patent) and Japanese Patent Laid-Open No. 10-150668 ('668 patent) (corresponding to U.S. Pat. No. 6,295,087) propose an adaptive simultaneous interpolation process in which correlation between a target pixel and nearby pixels is detected for each pixel and an optimum interpolation method is changed over depending on the detected correlation.

According to the '976 patent, horizontal and vertical high-frequency components are detected from an input image signal. When the input image signal contains high-frequency components in the horizontal direction at a large proportion, it is determined as a vertically striped signal having stronger correlation in the vertical direction, and an interpolation process suitable for the vertically striped signal is performed. When the input image signal contains high-frequency components in the vertical direction at a large proportion, it is determined as a horizontally striped signal having stronger correlation in the horizontal direction, and an interpolation process suitable for the horizontally striped signal is performed. When those two conditions are not satisfied, the interpolation process is performed using an average value among surrounding pixels.

Also, according to Japanese Patent Laid-Open No. 10-150668, degrees of correlation in horizontal, vertical and diagonal directions are computed and the interpolation process is performed in one of those three directions in which the correlation degree is maximum.

However, the related art is disadvantageous because a satisfactory interpolation process based on the correlation cannot be performed for pixels having correlation in directions other than the vertical and horizontal directions, and resolution in appearance deteriorates in the diagonal direction.

Further, in the adaptive interpolation process disclosed in the '976 patent, to determine a direction in which a preferable interpolation process is to be performed, high-frequency components in the vertical and horizontal directions contained in the image signal are first determined by computation. This process for detecting a correlation value has a band-pass characteristic such that a signal with a frequency component that is ¼ of the image sampling frequency fs reaches its peak, and signals in bands higher and lower than the ¼ frequency attenuate bilaterally symmetrically on both sides of fs/4.

When that correlation value extracting process is applied to signals in regions near the vertical and horizontal Nyquist frequencies, the correlation values in the vertical and horizontal directions should be ideally output as equal values because each signal in those regions contains a high-band component close to the Nyquist frequency in one of the vertical and horizontal directions and a low-band component close to the DC component in the other direction.

In practice, however, a difference occurs between the vertical correlation value and the horizontal correlation value due to effects of noise and an optical LPF, and the relation in magnitude between those two correlation values varies per pixel. Therefore, an error may be caused in determining the correlation direction using the vertical correlation value and the horizontal correlation value. This causes the interpolation result to change unnaturally per pixel thus resulting in deterioration of image quality.

According to the '668 patent, the number of directions for detecting the correlation is increased to more finely control a region in which a preferable interpolation process is to be performed. However, the interpolation result is changed discontinuously each time the determination result of the correlation direction changes, thus resulting in unnaturalness in image quality.

SUMMARY OF THE INVENTION

One object of the present invention is to overcome the above-mentioned problems in the state of the art.

The present invention addresses the problems of the related art by performing, among other functionalities, a preferable interpolation process for each pixel having correlation in an arbitrary direction, and preventing an interpolation result from being changed discontinuously with a change in the correlation direction.

According to one aspect of the present invention, there is provided an image processing apparatus comprising an input unit for inputting an image signal obtained with offset sampling per pixel; a correlation detecting unit for, based on the image signal input from the input unit, producing a coefficient depending on an arbitrary direction in which correlation between a plurality of pixels near a target pixel to be interpolated is high; and an interpolation unit for producing an interpolation image signal in accordance with the coefficient produced by the correlation detecting unit, and interpolating the image signal input from the input unit by using the interpolation image signal.

The present invention is also capable of reducing adverse effects upon the interpolation result caused by an error in determination of the correlation direction when pixels contain frequency components near vertical and horizontal Nyquist frequencies, and to perform an interpolation process in consideration of the correlation direction without causing unnaturalness in the entirety of an image.

Further features and advantages of the present invention will become apparent from the following description of the preferred embodiments with reference to the attached drawings.

BRIEF DESCRIPTION OF THE DRAWINGS

FIG. 7 is a representation showing one procedure in an interpolation process.

FIGS. 18A and 18B are block diagrams of a correlation determining unit.

FIGS. 19A, 19B and 19C are representations showing procedures in an interpolation process.

DETAILED DESCRIPTION OF THE EMBODIMENTS

Embodiments of the present invention will now be described.

First Embodiment

Figure 1:
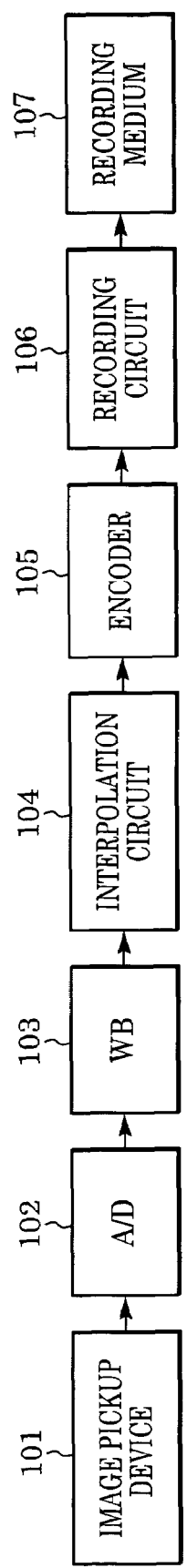
FIG. 1 is a block diagram of an image pickup device in accordance with an embodiment of the present invention.

FIG. 1 is a block diagram of a video camera in accordance with an embodiment of the present invention.

Figures 24, 25:
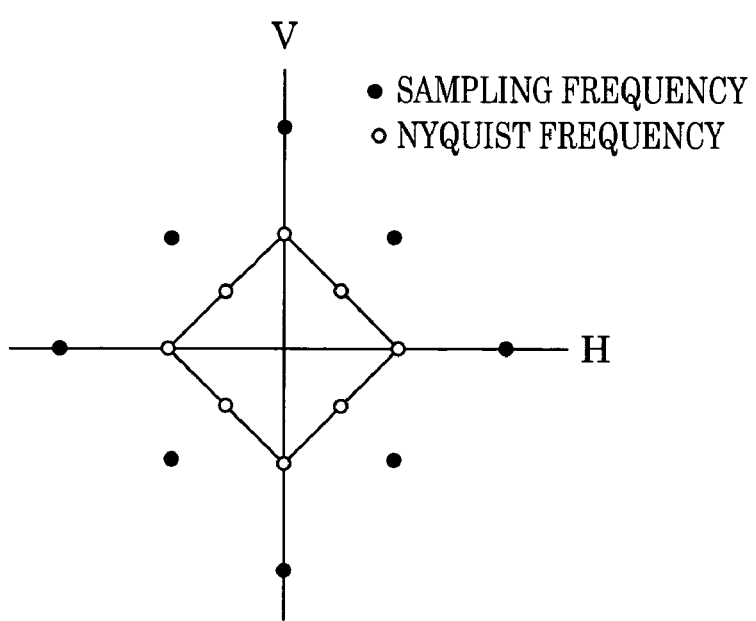
FIG. 24 is a representation showing an array of color filters.
FIG. 25 is a graph showing a frequency characteristic of image data.
Figures 26A, 26B:
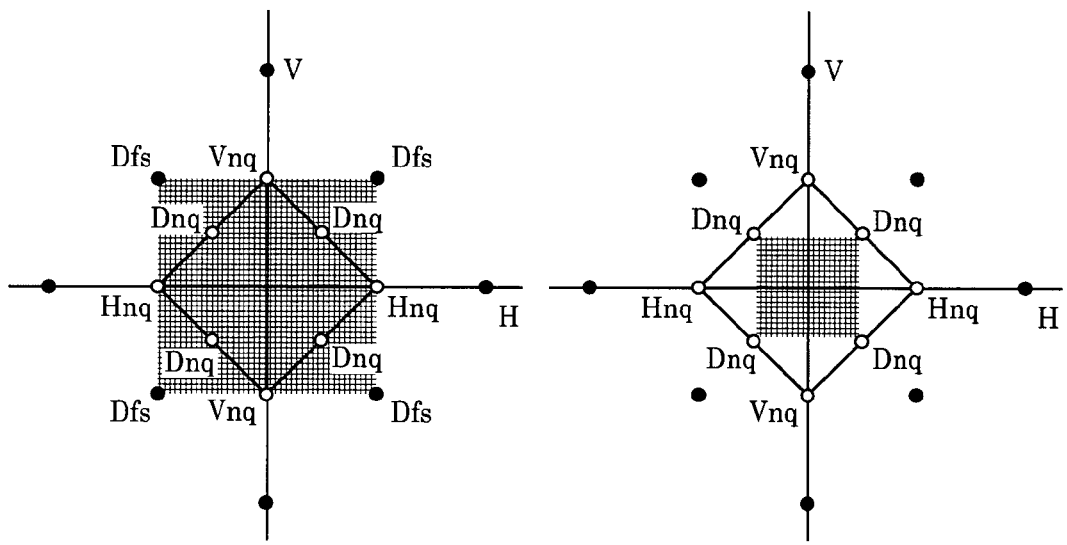
FIGS. 26A and 26B are graphs each showing a frequency characteristic of image data.
Figure 27:
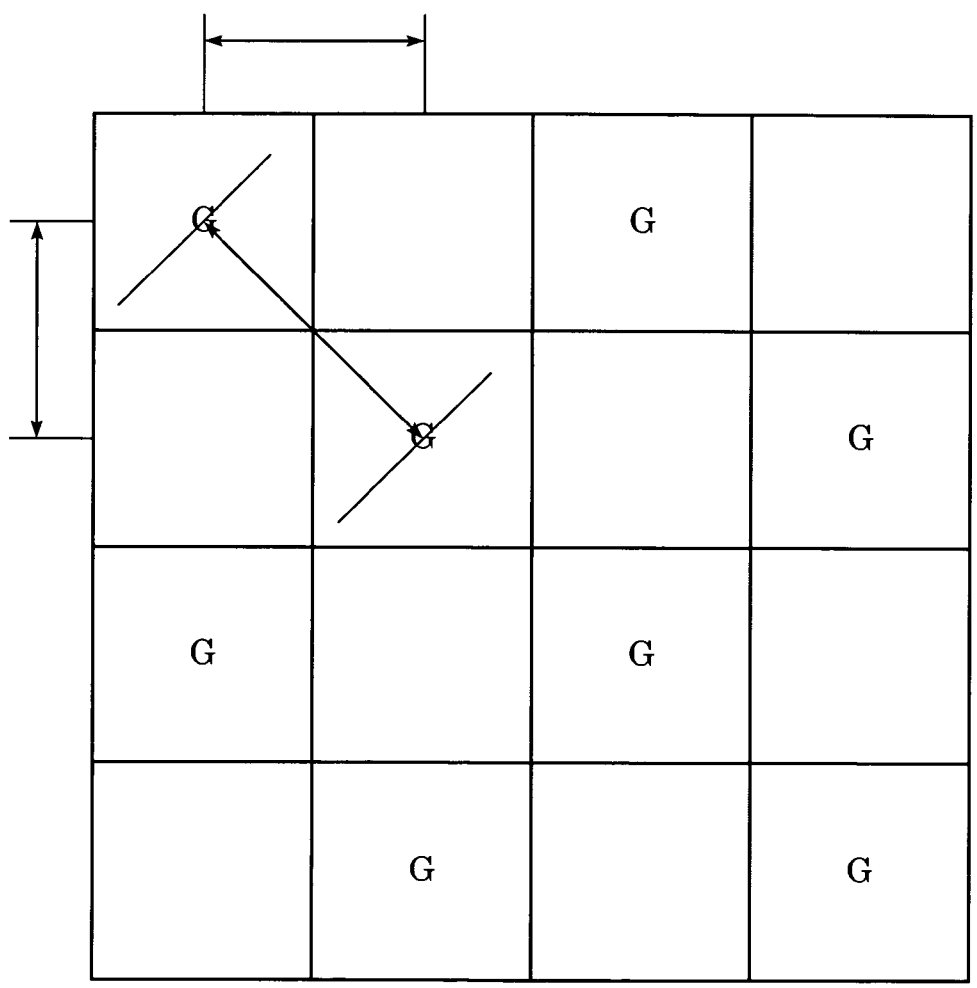
FIG. 27 is a representation showing a simultaneous interpolation process of G signals.

Referring to FIG. 1, an image pickup device 101 has color filters of a primary-color Bayer array shown in FIG. 24, and outputs RGB image signals corresponding to the color filters in respective pixels. The image signals output from the image pickup device 101 are converted into digital signals by an A/D converter 102 and are subjected to a white balance adjusting process in a white balance circuit (WB) 103. Resulting signals are then output to an interpolation circuit 104. The interpolation circuit 104 is designed in accordance with the present invention, and outputs a result obtained by performing a simultaneous interpolation process of G signals from RGB color values as described later. The image signals output from the interpolation circuit 104 are subjected to a known coding process in an encoder 105 and then recorded on a recording medium 107 through a recording circuit 106.

The interpolation circuit 104 will now be described.

Figure 2:
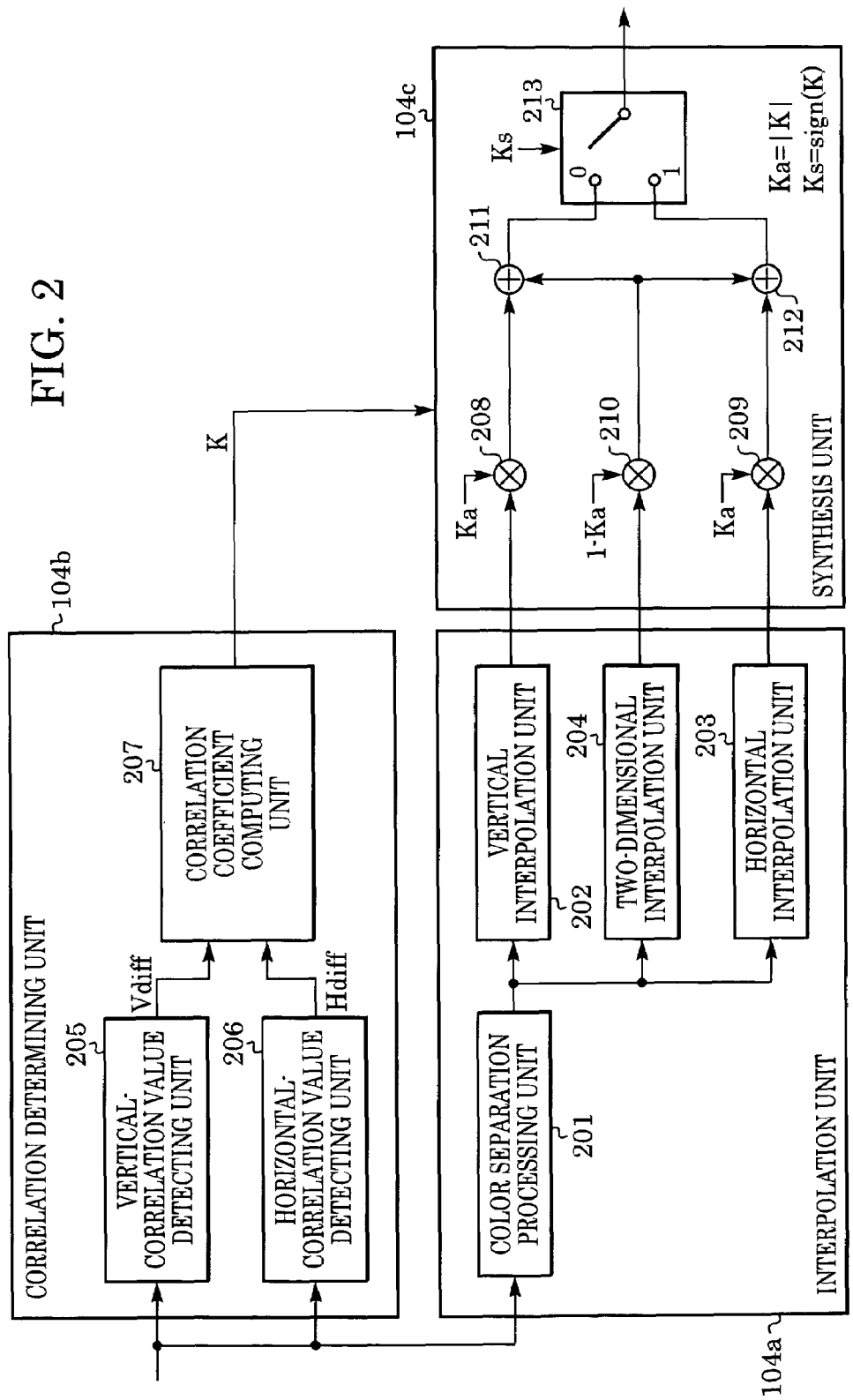
FIG. 2 is a block diagram of an interpolation circuit in accordance with an embodiment of the present invention.

FIG. 2 is a block diagram of the interpolation circuit 104.

Referring to FIG. 2, the image signals input from the WB 103 are processed by an interpolation unit 104a and a correlation determining unit 104b. Respective output signals of both the units 104a, 104b are input to a synthesis unit 104c, which outputs a final result of the simultaneous interpolation process of the G signals.

Here, the term "input image signal" means an image signal which has a color value of one of RGB corresponding to the color filter arranged per pixel and of which white balance has already been compensated by the WB 103.

Operations of those three units shown in FIG. 2 will now be described.

The interpolation unit 104a is first described.

In the interpolation unit 104a, pixels of the G signals to be subjected to the interpolation are extracted from the input image signals by a color separation processing unit 201. The extracted pixels are then output to a vertical interpolation unit 202, a horizontal interpolation unit 203 and a two-dimensional interpolation unit 204 which are connected in parallel. Those three interpolation units execute interpolation processes and output respective interpolation data.

From the color separation processing unit 201, by way of example, pixel values are output as they are, for the pixels where the G filters are arranged, and after replacing the pixel values with 0 for the pixels where the R or B filters are arranged.

While, in FIG. 2, the interpolation unit 104a incorporates the color separation processing unit 201, the interpolation unit 104a may be separate from the color separation processing unit 201. In the latter case, a color separation processing unit capable of separating any of RGB signals is disposed outside the interpolation unit 104a, and the G signals produced after color separation made in the color separation processing unit are input to the interpolation unit 104a.

The vertical interpolation unit 202, the horizontal interpolation unit 203, and the two-dimensional interpolation unit 204 will now be described.

Figure 3:
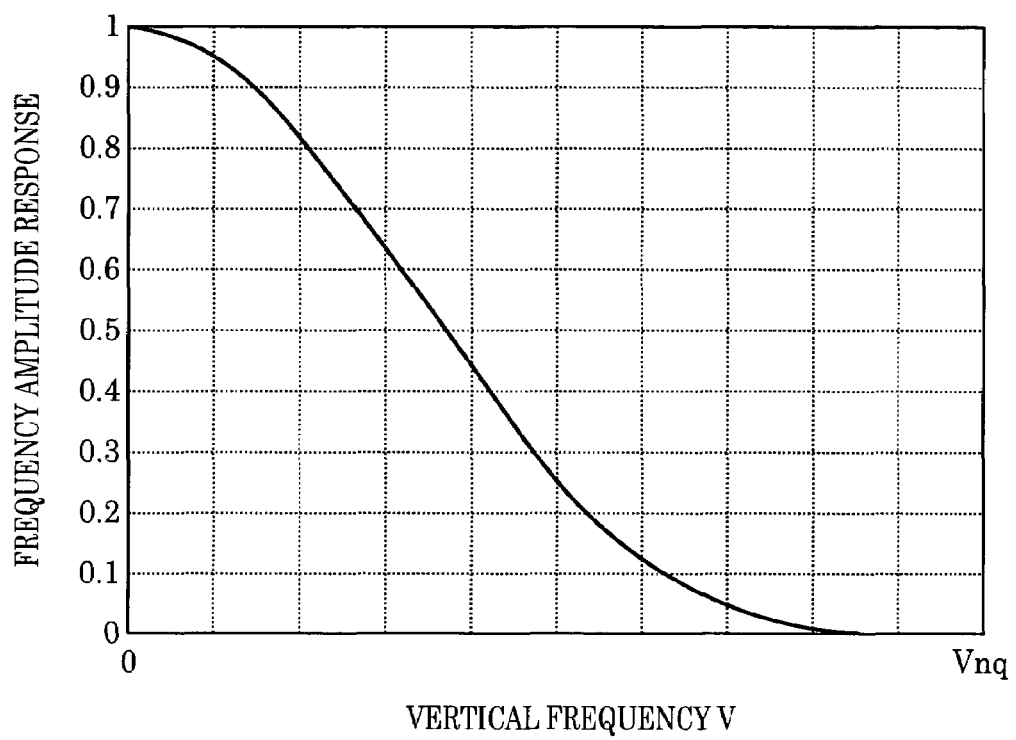
FIG. 3 is a graph of the frequency amplitude response vs vertical frequency of the interpolation circuit.

In the vertical interpolation unit 202, the interpolation process is executed based on the image signals of plural pixels adjacent to each other in the vertical direction by employing a one-dimensional low-pass filter having a cutoff characteristic with a 0 frequency amplitude response at the vertical Nyquist frequency as shown in FIG. 3.

Figure 4:
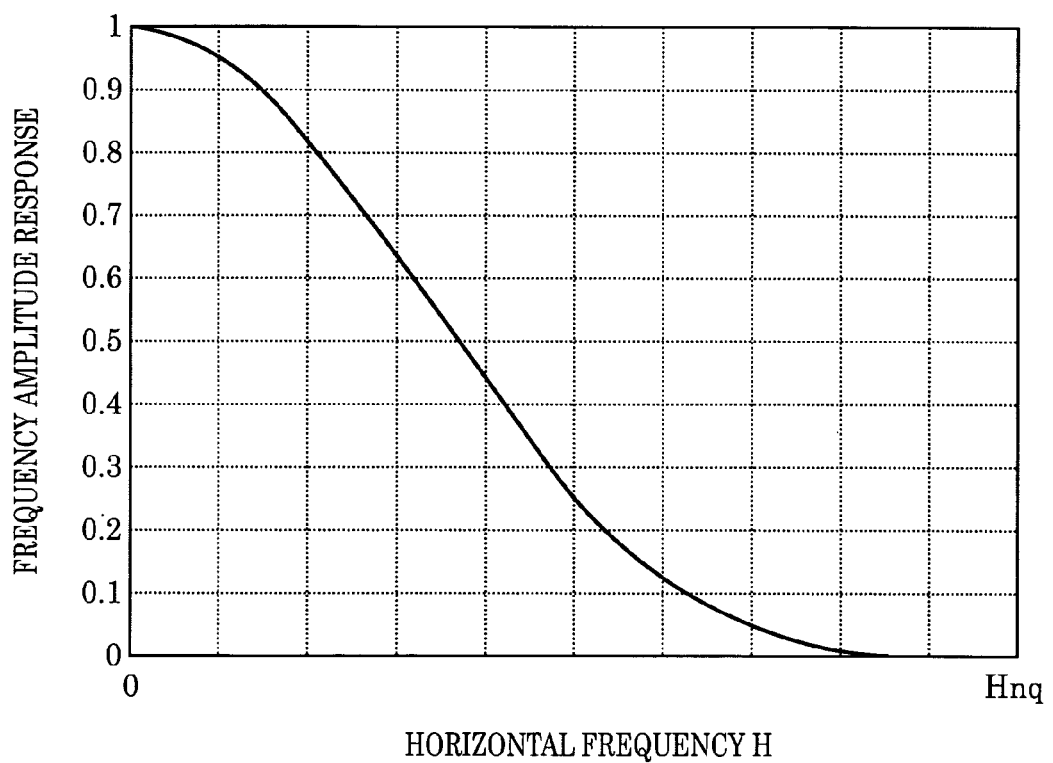
FIG. 4 is a graph of the frequency amplitude response vs horizontal frequency of the interpolation circuit.

In the horizontal interpolation unit 203, the interpolation process is executed based on the image signals of plural pixels adjacent to each other in the horizontal direction by employing a one-dimensional low-pass filter having a cutoff characteristic with a 0 frequency amplitude response at the horizontal Nyquist frequency as shown in FIG. 4.

In the two-dimensional interpolation unit 204, the interpolation process is executed based on the image signals of plural pixels adjacent to each other in the vertical and horizontal directions by employing a two-dimensional low-pass filter having a cutoff characteristic with a 0 frequency amplitude response at either the vertical Nyquist frequency Vnq or the horizontal Nyquist frequency H.

The processing in the correlation determining unit 104b will now be described.

The correlation determining unit 104b comprises, as shown in FIG. 2, a vertical correlation value detecting unit 205, a horizontal correlation value detecting unit 206, and a correlation coefficient computing unit 207. The correlation determining unit 104b produces a correlation coefficient K depending on the direction in which the correlation is maximum between the target pixel to be interpolated and the pixels around the target pixel.

Figure 6A:
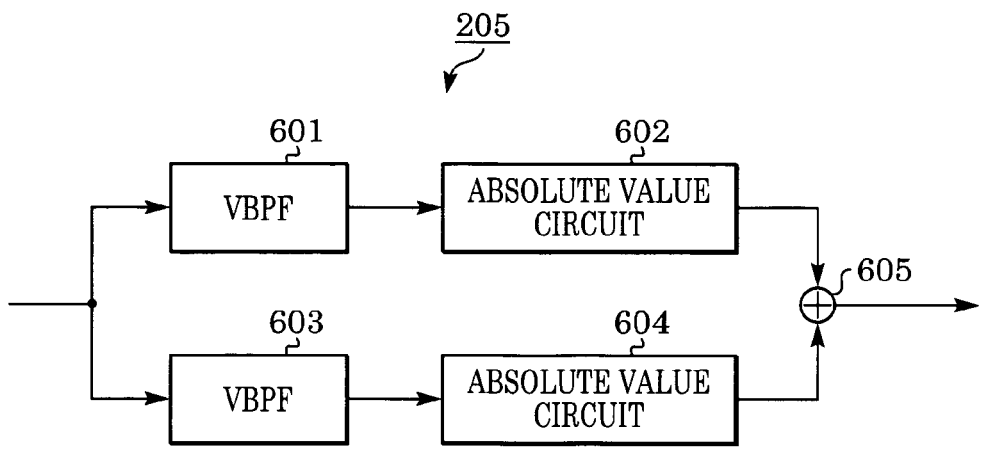
FIGS. 6A and 6B are block diagrams of a correlation determining unit.
Figure 6B:
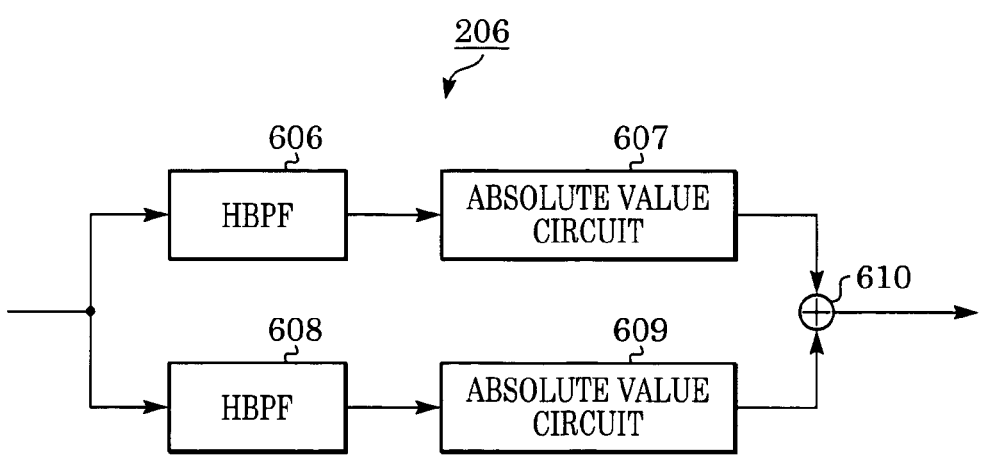

In the correlation determining unit 104b, the vertical correlation value detecting unit 205 and the horizontal correlation value detecting unit 206 extract signals containing particular vertical and horizontal frequency components, and output a vertical correlation value Vdiff and a horizontal correlation value Hdiff, respectively. FIGS. 6A and 6B are block diagrams of the vertical correlation value detecting unit 205 and the horizontal correlation value detecting unit 206.

Figure 7:
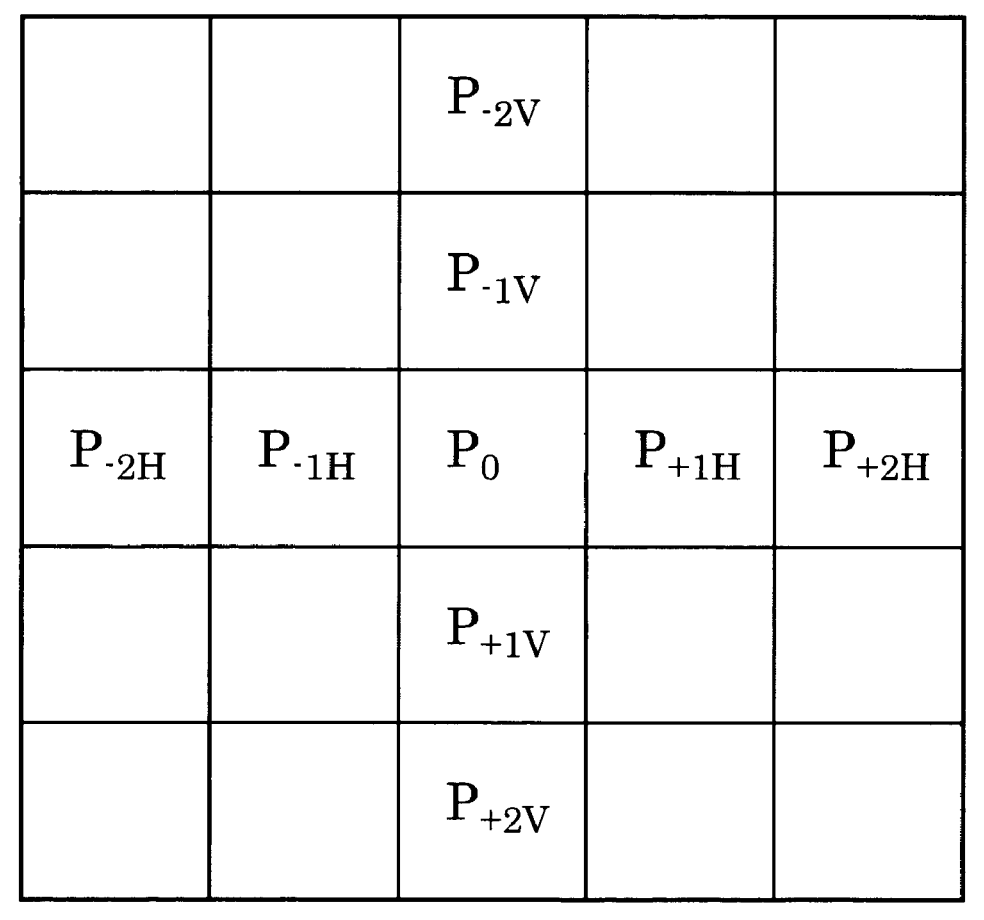

Each of the vertical correlation value detecting unit 205 and the horizontal correlation value detecting unit 206 executes processing on five and three adjacent pixels about a target pixel $P_0$, shown in FIG. 7, in the vertical or horizontal direction.

In the vertical correlation value detecting unit 205, five pixels $[P_{-2V}, P_{-1V}, P_0, P_{1V}, P_{2V}]$ about the target pixel $P_0$ in the vertical direction are processed by a band-pass filter VBPF 601 having filter coefficients [−1, 0, 2, 0, −1], and a resulting signal is applied to an absolute value circuit 602, thereby obtaining an absolute value signal. The three pixels $[P_{-1V}, P_0, P_{1V}]$ about the target pixel $P_0$ in the vertical direction are processed by a band-pass filter VBPF 603 having filter coefficients [1, 0, −1], and the resulting signal is applied to an absolute value circuit 604, thereby obtaining an absolute value signal. Those two absolute values are added by an adder 605, and the sum is output as the vertical correlation value Vdiff.

Also, in the horizontal correlation value detecting unit 206, five pixels $[P_{-2H}, P_{-1H}, P_0, P_{1H}, P_{2H}]$ about the target pixel $P_0$ in the horizontal direction are processed by a band-pass filter HBPF 606 having filter coefficients [−1, 0, 2, 0, −1], and the resulting signal is applied to an absolute value circuit 607, thereby obtaining an absolute value signal. Also, the three pixels $[P_{-1H}, P_0, P_{1H}]$ about the target pixel $P_0$ in the horizontal direction are processed by a band-pass filter HBPF 608 having filter coefficients [1, 0, −1], and the resulting signal is applied to an absolute value circuit 609, thereby obtaining an absolute value signal. Those two absolute values are added by an adder 610, and the sum is output as the horizontal correlation value Hdiff.

Figure 8:
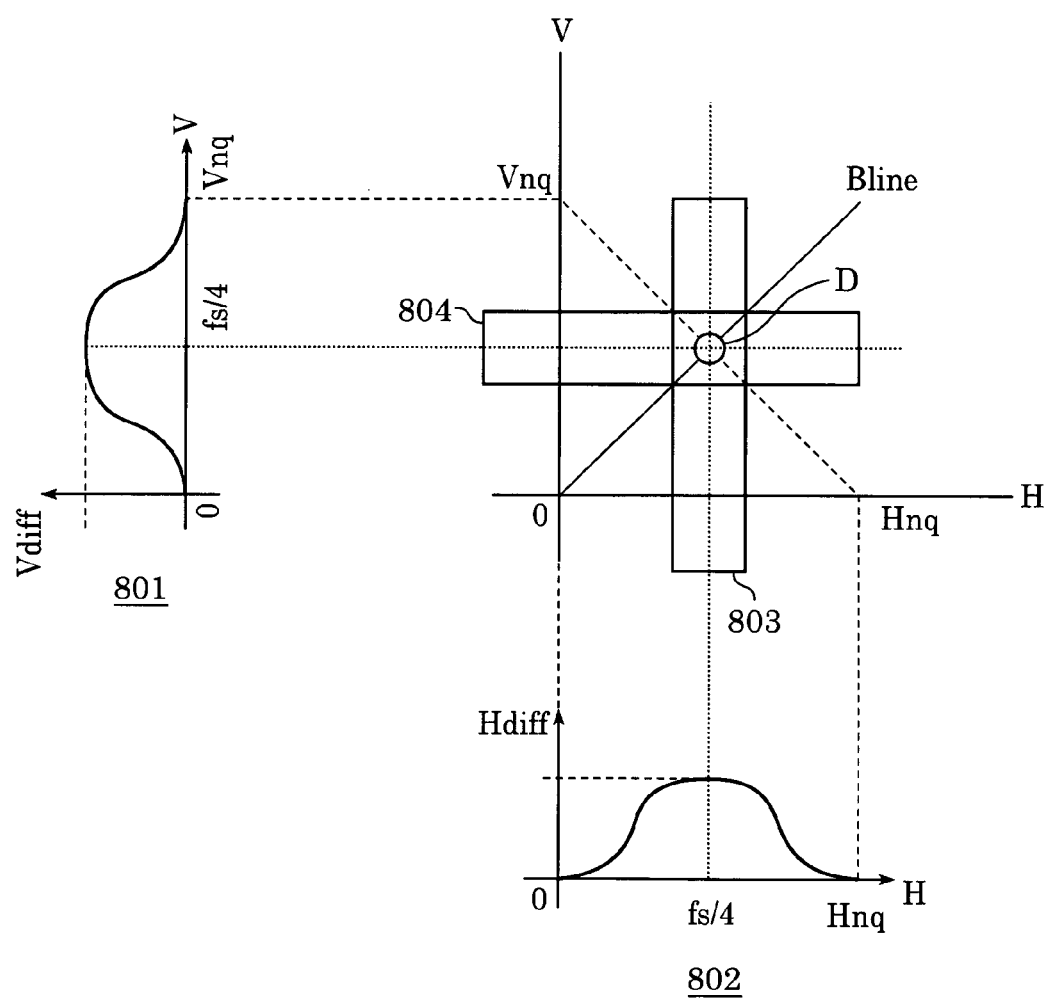
FIG. 8 shows an image characteristic.

FIG. 8 shows, on a two-dimensional frequency plane, the signals extracted by the vertical correlation value detecting unit 205 and the horizontal correlation value detecting unit 206.

In FIG. 8, a vertical axis V represents a frequency component in the vertical direction, a horizontal axis H represents a frequency component in the horizontal direction, and the origin represents a DC component. FIG. 8 shows only the first quadrant of the two-dimensional frequency plane.

Referring to FIG. 8, numeral 801, 802 represent respective frequency characteristics of the vertical correlation value detecting unit 205 and the horizontal correlation value detecting unit 206 described above with reference to FIGS. 6A and 6B. The output Vdiff or Hdiff of each unit 205, 206 is maximized when the input signal frequency is ¼ of the image sampling frequency fs.

Here, a large value of Vdiff indicates that high-frequency components in the vertical direction are somewhat concentrated. Looking at a corresponding image, a fine horizontally-striped pattern is observed.

A large value of Hdiff indicates that high-frequency components in the horizontal direction are somewhat concentrated. Looking at a corresponding image, a fine vertically-striped pattern is observed.

Also, because the vertical correlation value detecting unit 205 and the horizontal correlation value detecting unit 206 are each designed, as described above, to add respective outputs of the two absolute value circuits and to produce Hdiff and Vdiff, values of Hdiff and Vdiff are positive.

Further, as shown on FIG. 8, the values of the vertical correlation value Vdiff and the horizontal correlation value Hdiff are equal to each other on a straight line Bline that passes the origin and a point D where the vertical and horizontal frequency components are each fs/4. In a region closer to the horizontal axis H than the straight line Bline, the horizontal correlation value Hdiff is larger than the vertical correlation value Vdiff. In a region closer to the vertical axis V than the straight line Bline, the vertical correlation value Vdiff is larger than the horizontal correlation value Hdiff.

From that relationship between the vertical correlation value Vdiff and the horizontal correlation value Hdiff, the correlation coefficient computing unit 207 detects a direction between the vertical and horizontal directions in which the correlation is maximum between the target pixel to be interpolated and the pixels around the target pixel, and then produces a correlation coefficient K corresponding to the detected correlation direction.

The "correlation direction" detected in this embodiment will now be described with reference to FIG. 10.

Figure 10:
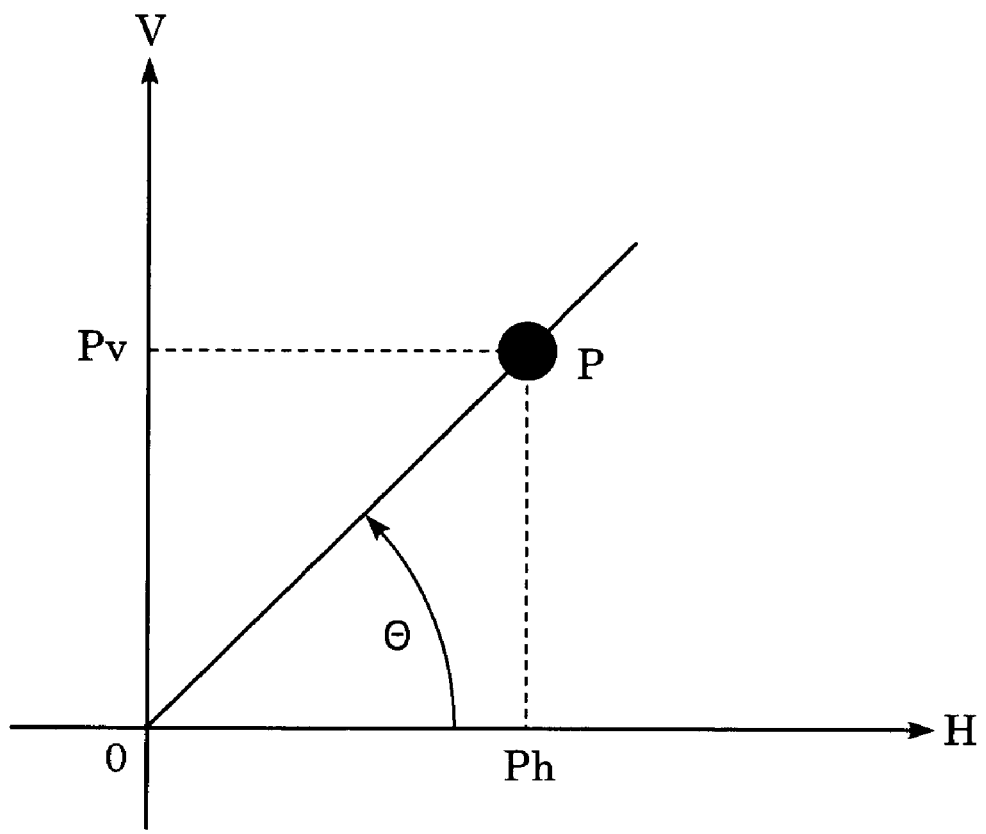
FIG. 10 is a graph for explaining a correlation direction.

In FIG. 10, a horizontal axis H represents a frequency component in the horizontal direction, and a vertical axis V represents a frequency component in the vertical direction. In this frequency plane, the correlation direction of a signal residing at a point P, which has a horizontal frequency component Ph and a vertical frequency component Pv, is given by a gradient a of a straight line connecting the point P and the origin o representing a DC component. For a straight line sloping at an angle θ relative to the horizontal direction, the gradient a is expressed by:

$$a = \tan \theta = Pv/Ph$$

Accordingly, if the frequency component in the horizontal direction and the frequency component in the vertical direction are extracted, the correlation direction can be determined from a ratio of the latter to the former.

In the correlation determining unit 104$b$, conversion of the image signal from time domain into frequency domain is not performed, and the frequency components in the vertical and horizontal directions contained in the image are estimated from the respective results of computations executed in the time domain by the vertical correlation value detecting unit 205 and the horizontal correlation value detecting unit 206 using the pixel values.

The processing in the correlation coefficient computing unit 207 will be described below with reference to the flowchart of FIG. 11.

Figure 11:
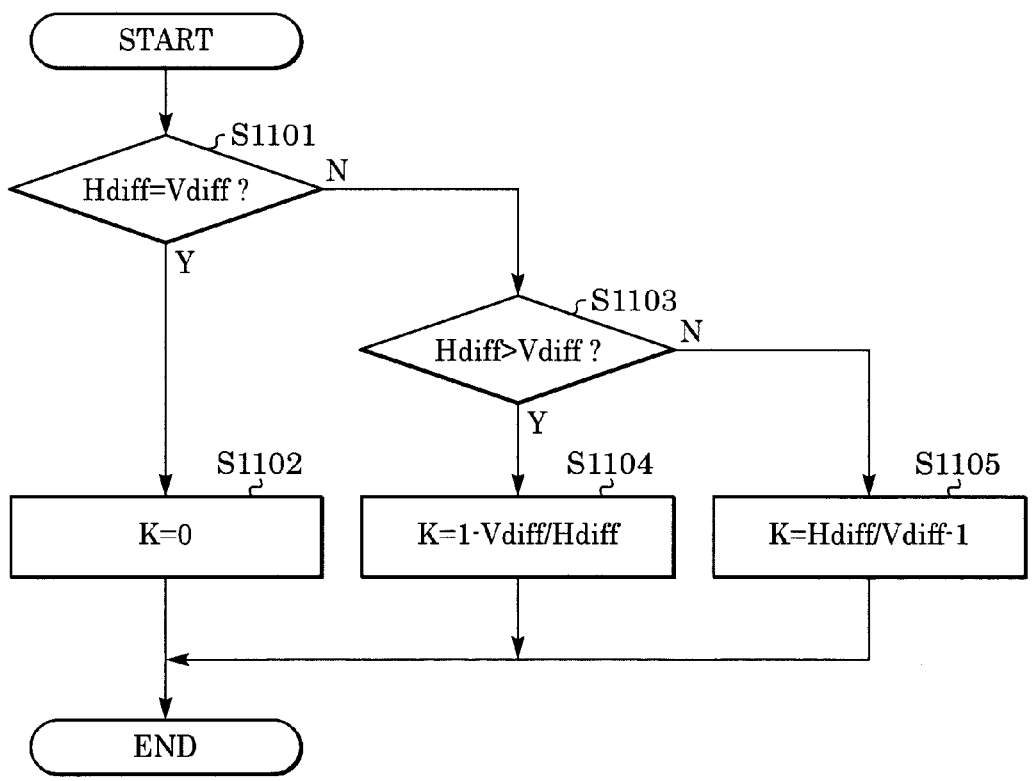
FIG. 11 is a flowchart showing a correlation determining process.

Referring to FIG. 11, respective values of Hdiff and Vdiff are first compared with each other in S1101. Then, if both the values are equal, the correlation coefficient K=0 is set (S1102). If the values differ from each other, the control flow proceeds to S1103.

In S1103, it is determined which one of Hdiff and Vdiff is larger. If Hdiff is larger, the control flow proceeds to S1104, and if Vdiff is larger, it proceeds to S1105.

In S1104, K is computed from the following formula (1) with Vdiff/Hdiff as a parameter:

$$K = 1 - V\text{diff}/H\text{diff} \quad (1)$$

In S1105, K is computed from the following formula (2) with Hdiff/Vdiff as a parameter:

$$K = H\text{diff}/V\text{diff} - 1 \quad (2)$$

With the processing described above, the correlation coefficient K is computed which has a value of from −1 to 1 and depends on the direction in which the target pixel to be interpolated has maximum correlation with respect to the pixels around the target pixel.

Figure 9:
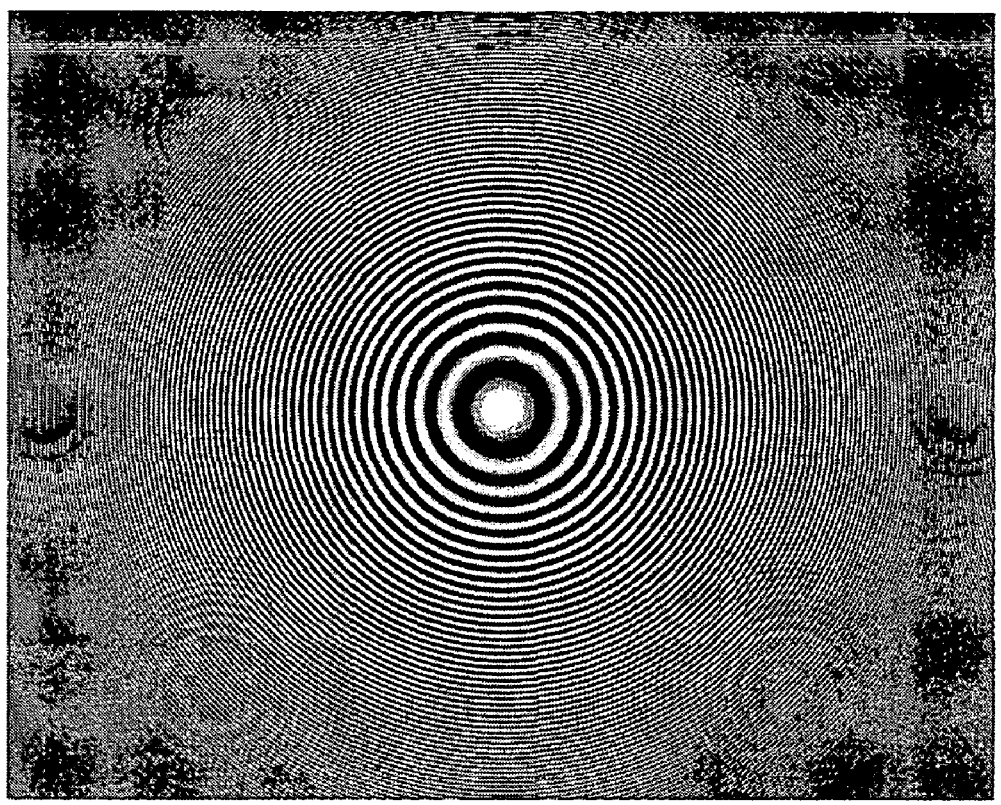
FIG. 9 is a CZP chart.
Figure 12:
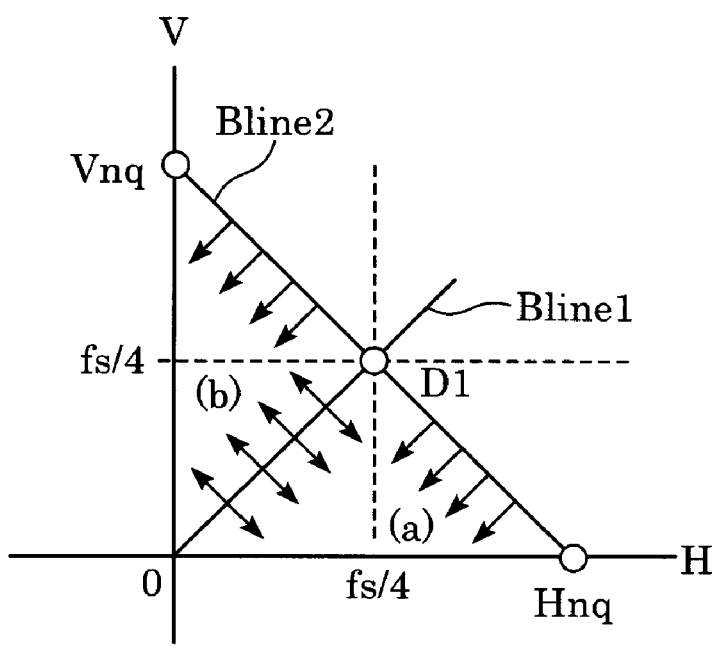
FIG. 12 is a graph showing behaviors of a correlation coefficient depending on the correlation direction.

FIG. 12 is a graph showing correspondence between the correlation coefficient K and the frequency component of each pixel resulting when the CZP chart of FIG. 9 is the input image.

In FIG. 12, a vertical axis V represents a frequency component in the vertical direction, a horizontal axis H represents a frequency component in the horizontal direction, and the origin represents a DC component. FIG. 12 shows only the first quadrant of the frequency plane, taking into account symmetry of the CZP chart.

Referring to FIG. 12, the correlation coefficient K=1 is obtained on the horizontal axis H, and the correlation coefficient K=−1 is obtained on the vertical axis V. A straight line Bline 1 connects the origin and a point D1 where the vertical and horizontal frequency components are each ¼ of the sampling frequency fs. A straight line Bline 2 is perpendicular to Bline 1, and the correlation coefficient K=0 is obtained on the straight line Bline 1 and the straight line Bline 2. Also, in the triangular region (a) defined by the straight line Bline 2 and the straight line Bline 1 and the horizontal axis H, the value of the correlation coefficient K changes from 0 to 1 in the arrow directions depending on the correlation direction. Further, in the triangular region (b) defined by the vertical axis V and the straight line Bline 2 and the straight line Bline 1, the value of the correlation coefficient K changes from 0 to −1 in directions of arrows depending on the correlation direction.

Finally, the processing in the synthesis unit 104$c$ will now be described.

In the synthesis unit 104$c$, two of the three interpolation values output from the interpolation unit 104$a$ are selected in accordance with the correlation coefficient K output from the correlation determining unit 104$b$. Then, a weighted average of the selected two interpolation values is calculated with the correlation coefficient K used as a mixing ratio, and is output as a final result of the simultaneous interpolation process of the G signals.

Detailed procedures of the synthesis of the interpolation values are as follows.

First, a sign Ks of the correlation coefficient K is discriminated from the most significant bit.

When the correlation coefficient K is a positive value, i.e., when Ks=0, a weighted average of the output of the vertical interpolation unit 202 and the output of the two-dimensional interpolation unit 204 is calculated from the following formula (3) using an absolute value Ka of the correlation coefficient K. The weighted average is selected as an output of an adder 211 by a switch 213 and is output as the final result of the simultaneous interpolation process of the G signals:

$$\text{Synthesized interpolation value 20} = \text{vertical interpolation value} \times Ka + \text{two-dimensional interpolation value} \times (1-Ka) \quad (3)$$

Accordingly, when the correlation coefficient K is K=1, i.e., when the vertical correlation value Vdiff is much larger than the horizontal correlation value Hdiff, only the vertical interpolation value is output as the final result of the simultaneous interpolation process of the G signals.

On the other hand, when the correlation coefficient K is a negative value, i.e., when Ks=1, a weighted average of the output of the horizontal interpolation unit 203 and the output of the two-dimensional interpolation unit 204 is calculated from the following formula (4) using the absolute value Ka of the correlation coefficient K. The weighted average is selected as an output of an adder 212 by the switch 213 and is output as the final result of the simultaneous interpolation process of the G signals:

$$\text{Synthesized interpolation value 21} = \text{horizontal interpolation value} \times Ka + \text{two-dimensional interpolation value} \times (1-Ka) \quad (4)$$

Accordingly, when the correlation coefficient K is K=−1, i.e., when the horizontal correlation value Hdiff is much larger than the vertical correlation value Vdiff, the horizontal interpolation value is output as the final result of the simultaneous interpolation process of the G signals.

Further, in the formulae (3) and (4), as Ka approaches 0, a proportion of the two-dimensional interpolation value occupying each of the synthesized interpolation value 20 and the synthesized interpolation value 21 increases. Here, Ka taking a value closer to 0 means that the vertical correlation value Vdiff and the horizontal correlation value Hdiff approach the same value and the correlation in the diagonal 45°-direction becomes higher. Therefore, resolution in appearance in the diagonal direction can be improved by setting the two-dimensional interpolation unit 204 to an interpolation characteristic weighted in the diagonal 45°-direction.

Figure 5:
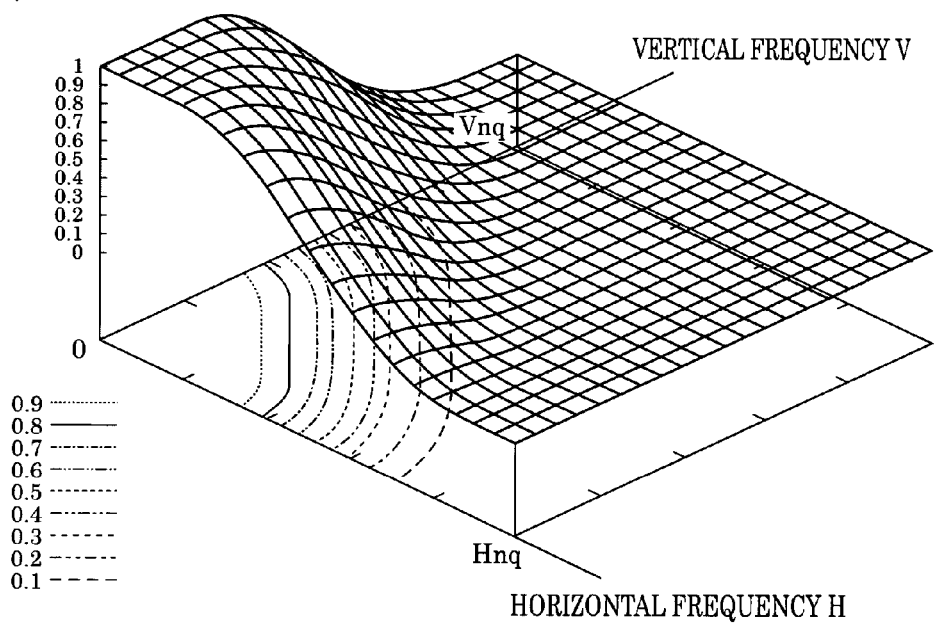
FIG. 5 is a graph of the frequency amplitude response, horizontal frequency and vertical frequency of the interpolation circuit.

The interpolation process suitable for such a case exhibiting high correlation in the diagonal direction can be realized with a two-dimensional low-pass filter having frequency characteristics, by way of example, shown in FIG. 5. That filter cuts off signals in a region outside the quadrilateral defined by the horizontal Nyquist frequency Hnq and the vertical Nyquist frequency Vnq without attenuating signals within the quadrilateral.

Deterioration of image quality attributable to turn-back of signals in the diagonal direction caused by offset sampling can thus be prevented, and good image quality can be obtained without impairing the appearance resolution in the diagonal direction.

Further, in this embodiment, the correlation coefficient representing the correlation direction is determined because the ratio of the horizontal correlation value to the vertical correlation value changes with a change of the correlation direction.

By executing the above-described interpolation value synthesis process using the correlation coefficient, when the correlation direction varies from the diagonal to the horizontal direction, for example, respective results of two kinds of interpolation processing means can be subjected to weighted summation. The weighted summation can occur while varying a coefficient to increase a proportion of the horizontal interpolation value depending on the change in correlation direction relative to the interpolation value, as a base, which is produced by the interpolation process suitable for the pixel having high correlation in the diagonal direction.

Therefore, the synthesized output result of the interpolation process suitable for the diagonal direction and the horizontal interpolation value changes moderately, and no unnaturalness occurs in image quality.

The above description is similarly applied to the case in which the correlation direction varies from the diagonal direction toward the vertical direction.

Thus, according to this embodiment, the offset-sampled G signals are interpolated through the steps of detecting vertical and horizontal correlation values of a target pixel to be interpolated, estimating from the detected correlation values in which direction the target pixel has higher correlation, and computing a coefficient value corresponding to the estimated correlation direction. Then, interpolation data in the vertical or horizontal direction and interpolation data in the diagonal direction are subjected to weighted summation based on the computed coefficient value. As a result, a proportion of either the vertical or horizontal direction interpolation data relative to the diagonal direction interpolation data can be continuously changed without causing a discontinuous change in interpolation result when the correlation direction changes.

Second Embodiment

A second embodiment will now be described.

An interpolation circuit of the second embodiment has a similar basic configuration to that of the first embodiment shown in FIG. 2. The second embodiment differs from the first embodiment in the correlation coefficient computing unit 207 of the correlation determining unit 104b. Therefore, the following description is made of the correlation coefficient computing unit 207, and the other components are not described here.

The processing executed in this embodiment by the correlation determining unit 104b to output the correlation coefficient K from the correlation coefficient computing unit 207 based on the output signals of the vertical correlation value detecting unit 205 and the horizontal correlation value detecting unit 206, i.e., Vdiff and Hdiff, will be described below with reference to the flowchart of FIG. 13.

Figure 13:
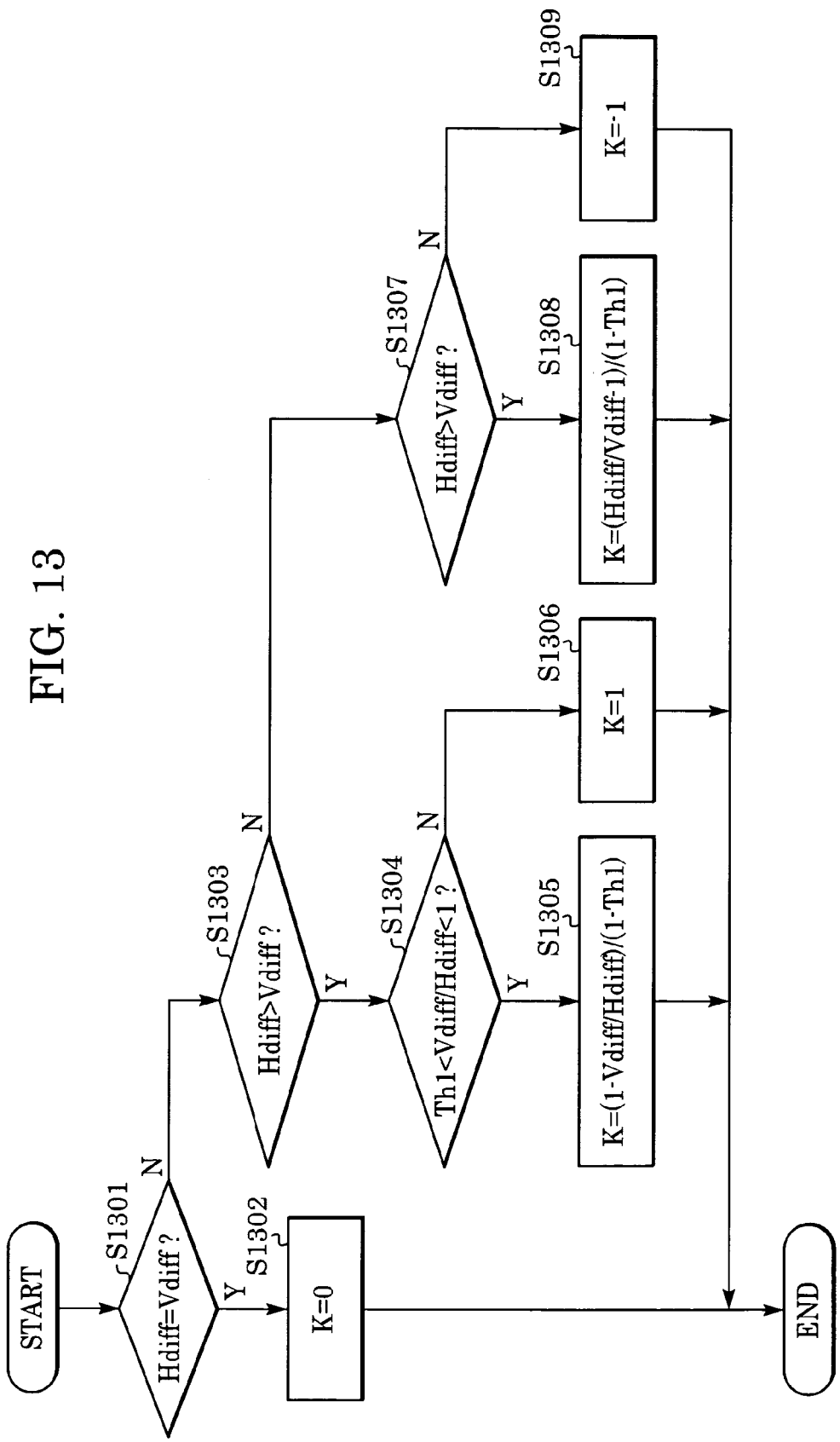
FIG. 13 is a flowchart showing the correlation determining process.

Referring to FIG. 13, respective values of Hdiff and Vdiff are first compared with each other in S1301. Then, if both values are equal, the correlation coefficient K=0 is set (S1302). If the values differ from each other, the control flow proceeds to S1303.

In S1303, it is determined which one of Hdiff and Vdiff is larger. If Hdiff is larger, the control flow proceeds to S1304, and if Vdiff is larger, it proceeds to S1307.

In S1304, it is determined whether Vdiff/Hdiff is larger than a predetermined threshold Th1 and whether it is smaller than 1. If Vdiff/Hdiff is larger than Th1 and smaller than 1, K is computed from the following formula (5) (S1305), otherwise, K=1 is set (S1306):

$$K=(1-Vdiff/Hdiff)/(1-Th1) \quad (5)$$

In S1307, it is determined whether Hdiff/Vdiff is larger than the threshold Th1 and whether it is smaller than 1. If Hdiff/Vdiff is larger than Th1 and smaller than 1, K is computed from the following formula (6) (S1308), otherwise, K=−1 is output (S1309):

$$K=(Hdiff/Vdiff-1)/(1-Th1) \quad (6)$$

With the processing described above, the correlation coefficient K having a value of from −1 to 1 is output.

Here, the threshold Th1 is a constant that depends on $\theta$ and is expressed by Th1=tan $\theta$ (0°≦$\theta$<45°).

Figure 14:
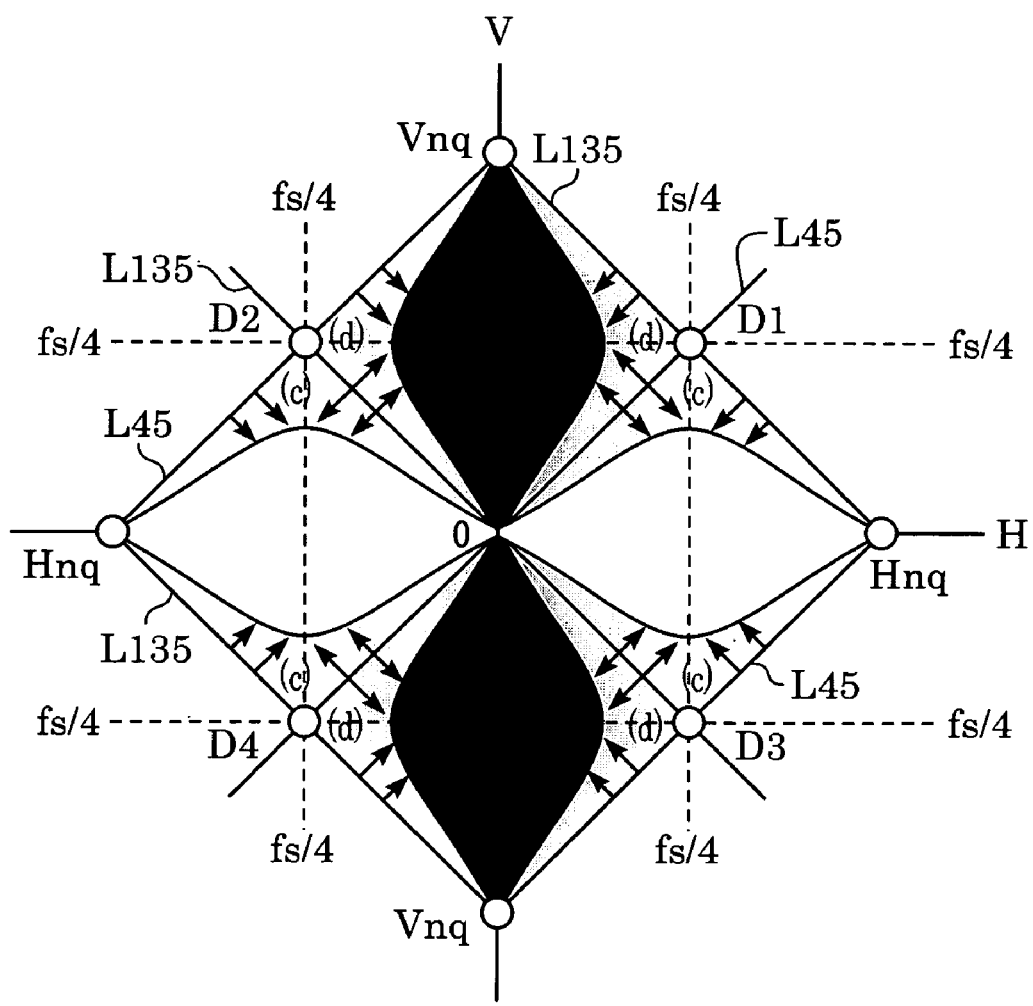
FIG. 14 is a graph showing behaviors of the correlation coefficient and a frequency domain.

FIG. 14 is a graph showing correspondence between the correlation coefficient K and the frequency component of each pixel when the CZP chart of FIG. 9 is the input image. Note that the correlation coefficient K is based on Th1=tan 15°. In FIG. 14, a vertical axis V represents a frequency component in the vertical direction, a horizontal axis H represents a frequency component in the horizontal direction, and the origin represents a DC component.

In this embodiment, because the threshold Th1 is set in the correlation coefficient computing unit 207, a region can be provided where the correlation coefficient K is held at 1 or −1 regardless of each proportion of Hdiff and Vdiff.

More specifically, in FIG. 14, the correlation coefficient K=1 is constantly set in a region indicated by white, and the correlation coefficient K=−1 is constantly set in a region indicated by black.

Accordingly, when the vertical correlation value or the horizontal correlation value is very large, the synthesis unit 104c in the downstream stage can output the vertical interpolation data or the horizontal interpolation data as it is, so that image resolution can be improved in both the vertical and horizontal directions.

On the other hand, the correlation coefficient K=0 is set on a straight lines L45, L135, shown in FIG. 14, which pass positions of the horizontal Nyquist frequency Hnq and the vertical Nyquist frequency Vnq and which have respective gradients of 45°, 135° relative to the horizontal axis H.

Then, as in the first embodiment, as the correlation coefficient K approaches 0, a proportion of the two-dimensional interpolation value of the final result of the simultaneous interpolation process of the G signals increases. Therefore, the appearance resolution in the diagonal direction can be improved.

Further, in FIG. 14, the correlation coefficient K in a gray region (c) is distributed as a value that continuously changes from K=0 to K=1 depending on the change in correlation direction along directions shown by arrows (from the diagonal lines L45, L135 toward the white region). Likewise, the correlation coefficient K in a gray region (d) is distributed as a value continuously changing from K=0 to K=−1 depending on a change of the correlation direction in directions of arrows from the diagonal lines L45, L135 toward the black region.

Therefore, the synthesized output result of the interpolation data in the diagonal direction and the horizontal or vertical interpolation data from the synthesis unit 104c changes moderately, and no unnaturalness occurs in image quality.

Further, in this embodiment, the processing in the synthesis unit 104c can be controlled such that higher priority is given to the resolution in appearance in the vertical and horizontal directions by setting Th1 to a larger value, and is given to the resolution in appearance in the diagonal direction by setting Th1 to a smaller value. Accordingly, by adjusting the value of the threshold Th1 relative to balancing image resolution in between the vertical and horizontal directions and the diagonal direction, the interpolation process can be satisfactorily performed regardless of the correlation direction.

Third Embodiment

Figure 15:
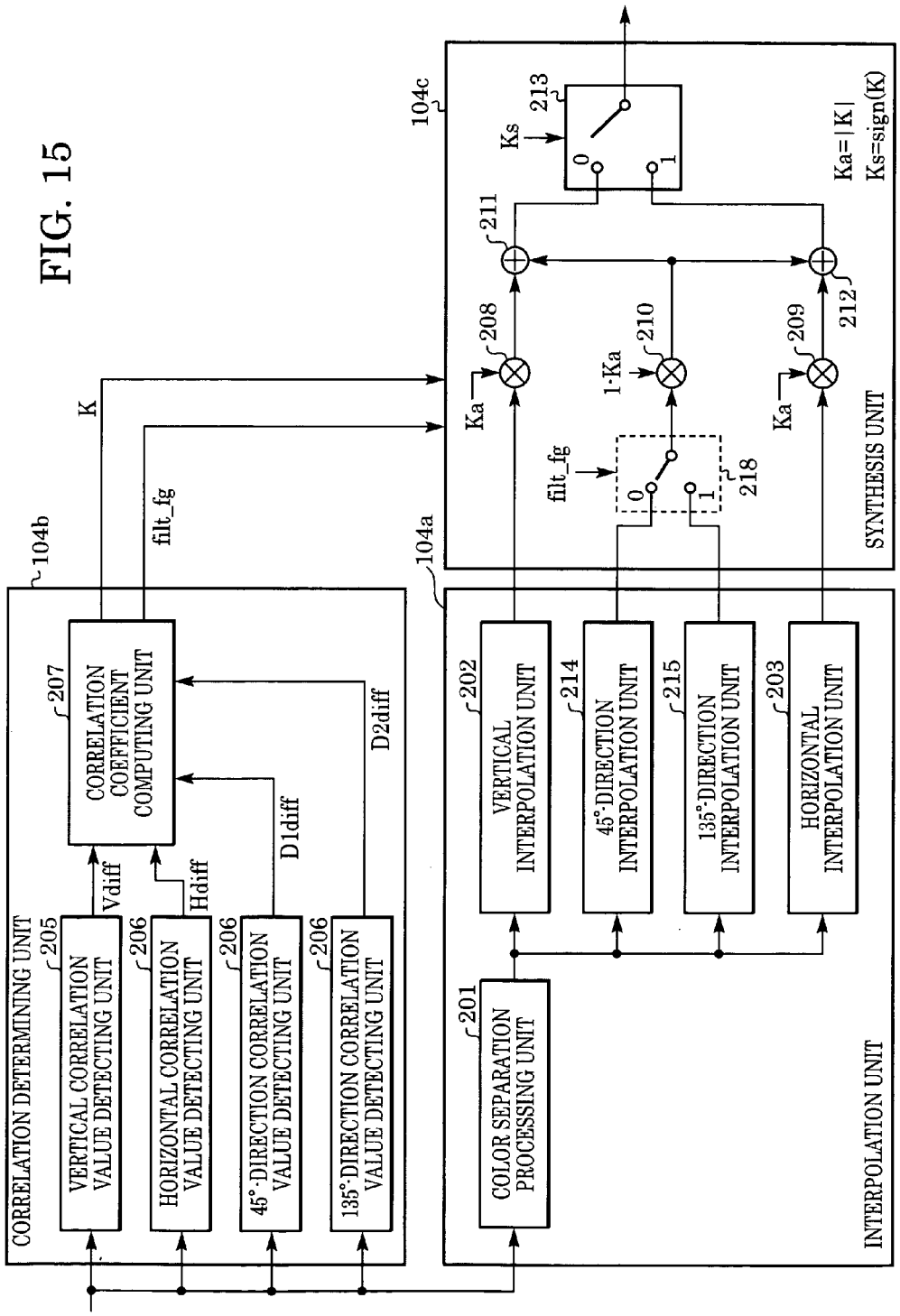
FIG. 15 is a block diagram of an interpolation circuit.

FIG. 15 is a block diagram of an interpolation circuit 104 according to a third embodiment of the present invention. In FIG. 15, components similar to those in FIG. 2 are denoted by the same numerals.

Referring to FIG. 15, input image signals are processed in an interpolation unit 104a and a correlation determining unit 104b in parallel. Then, respective output signals from the two units 104a, 104b are input to a synthesis unit 104c that outputs a final result of the simultaneous interpolation process of G signals.

The interpolation unit 104a is first described. In the interpolation unit 104a, G-signal pixels to be interpolated are extracted by a color separation processing unit 201 and then output to four interpolation units 202, 203, 214 and 215 connected in parallel. The color separation processing unit 201 is similar to that of the first embodiment, and a description thereof is omitted here.

Processing in each interpolation unit will now be described.

A vertical interpolation unit 202 and a horizontal interpolation unit 203 are similar to those of the first embodiment, and a description thereof is omitted here.

Figure 16:
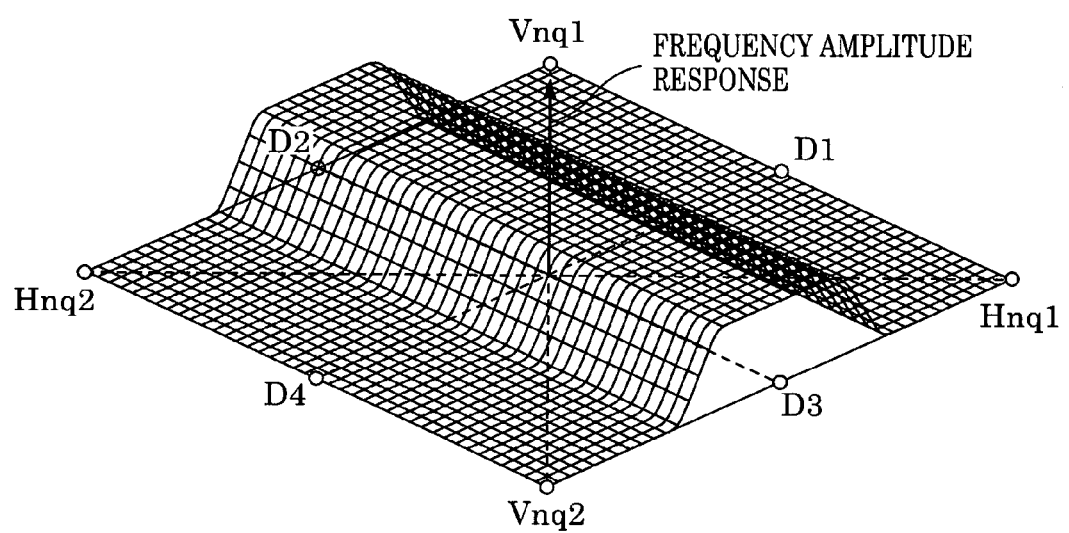
FIG. 16 is a graph of the frequency amplitude response and other characteristics of the interpolation circuit.

In a 45°-direction interpolation unit 214, a filtering process is executed by employing a two-dimensional low-pass filter having the cutoff characteristic (FIG. 16) in the diagonal 45°-direction connecting a vertical Nyquist frequency Vnq1 and a horizontal Nyquist frequency Hnq2 to output interpolation data.

Figure 17:
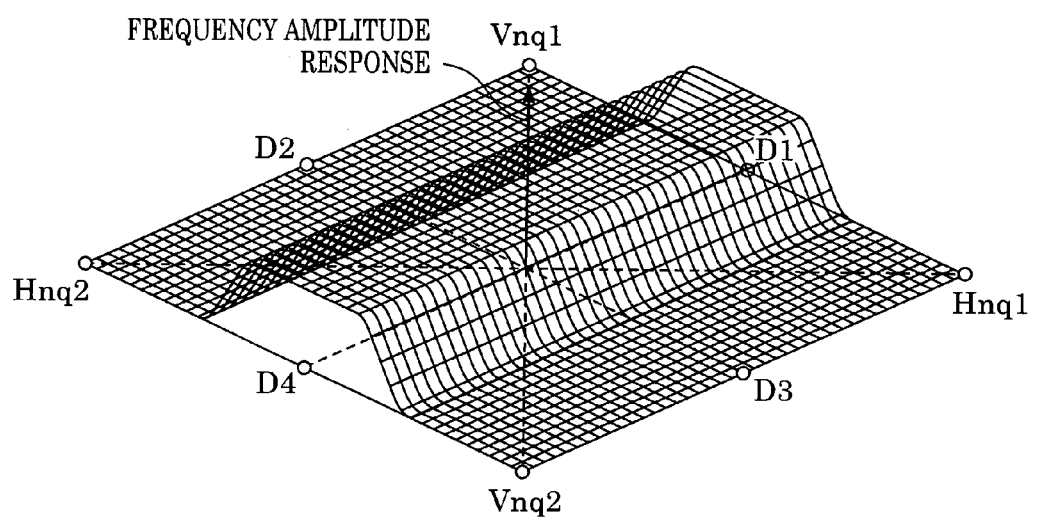
FIG. 17 is a graph of the frequency amplitude response and other characteristics of the interpolation circuit.

Also, in a 135°-direction interpolation unit 215, a filtering process is executed by employing a two-dimensional low-pass filter having a cutoff characteristic (FIG. 17) in the diagonal 135°-direction connecting the vertical Nyquist frequency Vnq1 and a horizontal Nyquist frequency Hnq1 to output interpolation data.

The processing in the correlation determining unit 104b will now be described.

In the correlation determining unit 104b, a vertical correlation value detecting unit 205, a horizontal correlation value detecting unit 206, a 45°-direction correlation value detecting unit 216, and a 135°-direction correlation value detecting unit 217 execute filtering processes to determine particular frequency components in the corresponding directions, and output a vertical correlation value Vdiff, a horizontal correlation value Hdiff, a 45°-direction correlation value D1diff, and a 135°-direction correlation value D2diff, respectively.

The vertical correlation value detecting unit 205 and the horizontal correlation value detecting unit 206 are the same as those in the first embodiment, and a description thereof is omitted here. The processing executed by the 45°-direction correlation value detecting unit 216 and the 135°-direction correlation value detecting unit 217 will now be described.

FIGS. 18A and 18B are block diagrams of the 45°-direction correlation value detecting unit 216 and the 135°-direction correlation value detecting unit 217, respectively.

In the 45°-direction correlation value detecting unit 216 and the 135°-direction correlation value detecting unit 217, unlike the vertical correlation value detecting unit 205 and the horizontal correlation value detecting unit 206, the filtering process is executed using pixels in which G-color filters are arranged as shown in FIGS. 19A to 19C and FIGS. 20A and 20B.

In the 45°-direction correlation value detecting unit 216, as shown in FIG. 18A, the image signals are first input to a color filter discrimination circuit 1801 to determine what color filter is arranged in a target pixel. For example, if pixel G22 in FIGS. 19A to 19C were the target pixel, the color filter discrimination circuit 1801 determines whether the G-color filter is arranged in the target pixel G22, and then outputs a discrimination signal G_fg. When the G-color filter is arranged in the target pixel as shown in FIG. 19A, G_fg=1 is output, and when the G-color filter is not arranged in the target pixel as shown in FIG. 19C, G_fg=0 is output.

When the G-color filter is arranged in the target pixel, i.e., in the case of G_fg=1, the target pixel G22 and the two pixels G13, G31 adjacent to the former in the 45°-direction are subjected to a filtering process in the diagonal direction by a filter D1_BPF 1805 having coefficients [−1, 2, −1], and a filtered signal is output through an absolute value circuit 1808.

On the other hand, when the G-color filter is not arranged in the target pixel, i.e., in the case of G_fg=0, a row of pixels G13, G22 (target pixel) and G31 adjacent to each other in the diagonal direction have no G-color pixel values as shown in FIG. 19C, and the filtering process cannot be executed.

Figure 20A:
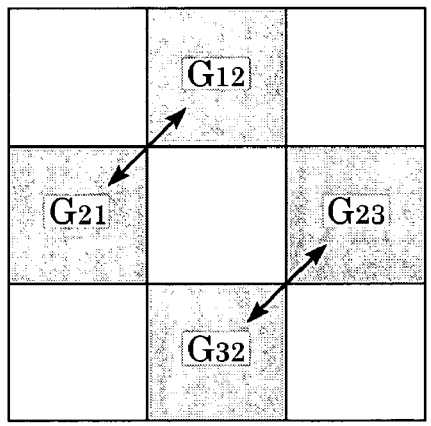
FIGS. 20A and 20B are representations showing procedures in the interpolation process.

For that reason, as shown in FIG. 20A, the 45°-direction correlation value is detected using four pixels which are in the vicinity of the target pixel G22 and in which the G-color filters are arranged, i.e., G12, G21, G23 and G32. More specifically, G12 and G21 are subjected to a filtering process in the diagonal direction by a filter D1_HPF 1803 having coefficients [1, −1], and a filtered signal is output through an absolute value circuit 1806. Also, G23 and G32 are subjected to a filtering process in the diagonal direction by a filter D1_HPF 1804 having coefficients [1, −1], and a filtered signal is output through an absolute value circuit 1807. Two absolute value signals are added in an adder 1809, and the sum is multiplied by ½ in a multiplier 1810 to provide an average value.

Likewise, in the 135°-direction correlation value detecting unit 217, as shown in FIG. 18B, the image signals are first input to a color filter discrimination circuit 1812 that outputs a discrimination signal G_fg in a similar manner. When the G-color filter is arranged in the target pixel as shown in FIG. 19B, G_fg=1 is output, and when the G-color filter is not arranged in the target pixel as shown in FIG. 19C, G_fg=0 is output.

When the G-color filter is arranged in the target pixel, the target pixel G22 and the two pixels G11, G33 adjacent to the target pixel in the 135°-direction are subjected to a filtering process in the diagonal direction by a filter D2_BPF 1819 having coefficients [−1, 2, −1], and a filtered signal is output through an absolute value circuit 1819.

Figure 20B:
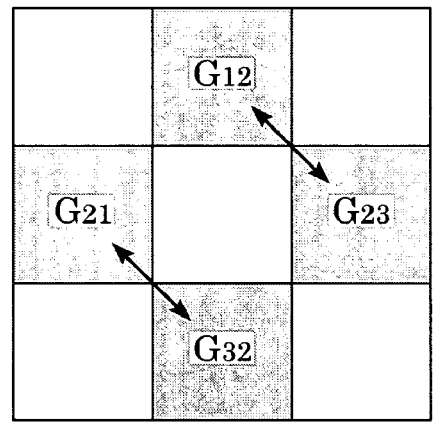

On the other hand, when the G-color filter is not arranged in the target pixel, a row of pixels G11, G22 (target pixel) and G33 adjacent to each other in the diagonal direction have no G-color pixel values as shown in FIG. 19C, and the filtering process cannot be executed. For that reason, as shown in FIG. 20B, the 135°-direction correlation value is detected using four pixels which are in the vicinity of the target pixel G22 and in which the G-color filters are arranged, i.e., G12, G21, G23 and G32.

More specifically, G12 and G23 are subjected to a filtering process in the diagonal direction by a filter D2_HPF 1814 having coefficients [1, −1], and a filtered signal is output through an absolute value circuit 1817. Also, G21 and G32 are subjected to a filtering process in the diagonal direction by a filter D2_HPF 1815 having coefficients [1, −1], and a filtered signal is output through an absolute value circuit 1818. Two absolute value signals are added in an adder 1820, and the sum is multiplied by ½ in a multiplier 1821 to output an average value.

Further, because the absolute values are output to each of the 45°-direction correlation value detecting unit 216 and the 135°-direction correlation value detecting unit 217, values of D1diff and D2diff are positive.

Figure 21:
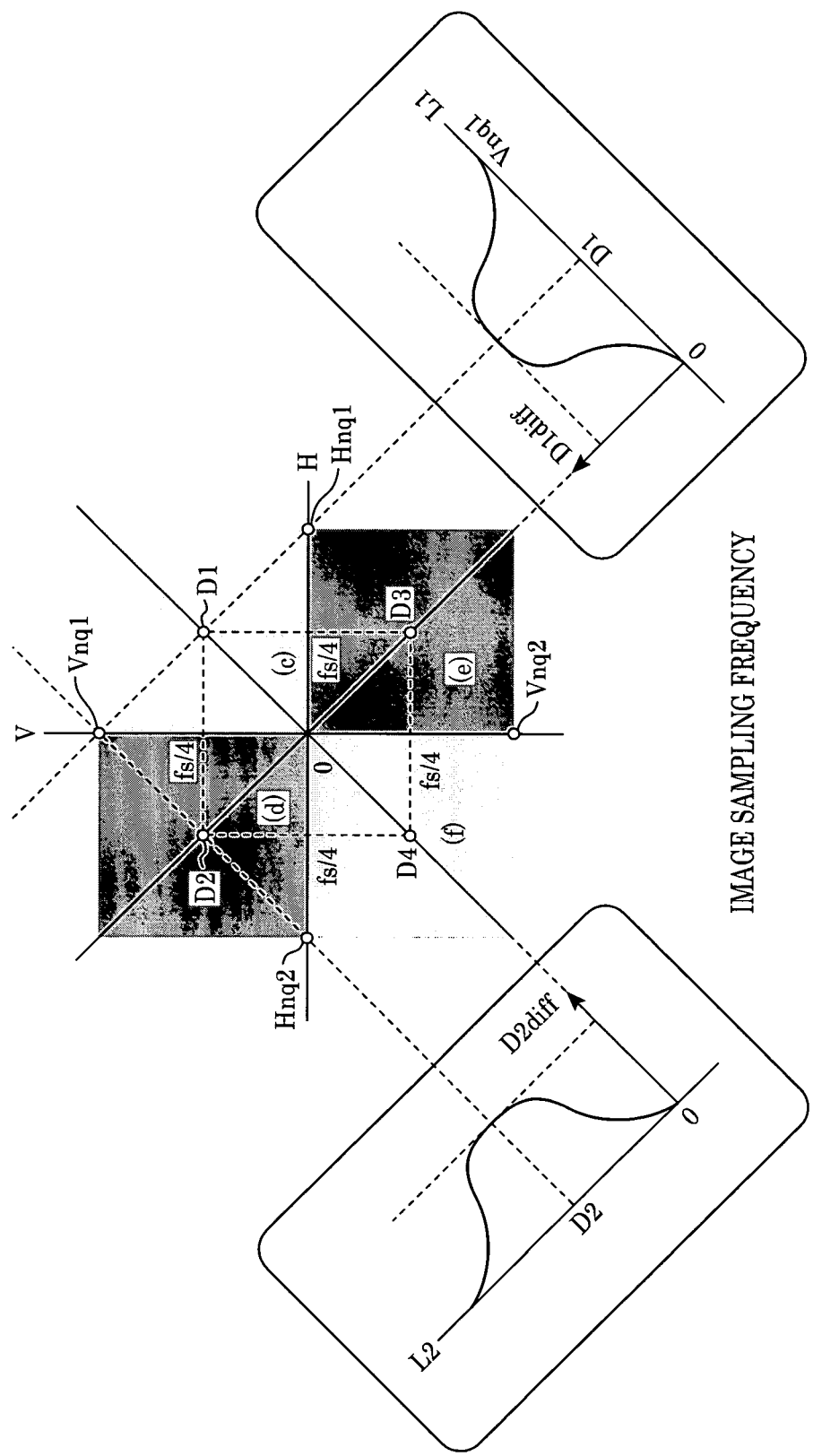
FIG. 21 is a graph for explaining a correlation direction.

FIG. 21 shows, on a two-dimensional frequency plane, the signals extracted by the 45°-direction correlation value detecting unit 216 and the 135°-direction correlation value detecting unit 217.

In FIG. 21, a vertical axis V represents a frequency component in the vertical direction, a horizontal axis H represents a frequency component in the horizontal direction, and the origin represents a DC component.

Symbol (a) in FIG. 21 represents a frequency characteristic of the filtering process executed in the 45°-direction correlation value detecting unit 216. With this filtering process, the output signal D1diff is maximized when a signal is input. The signal has a frequency component on a straight line extending in the 135°-direction and passing both the vertical Nyquist frequency Vnq1 and the horizontal Nyquist frequency Hnq1.

Symbol (b) in FIG. 21 represents a frequency characteristic of the filtering process executed in the 135°-direction correlation value detecting unit 217. With this filtering process, the output signal D1diff is maximized when a signal is input, the signal having a frequency component on a straight line extending in the 45°-direction and passing both the vertical Nyquist frequency Vnq1 and the horizontal Nyquist frequency Hnq2.

Here, a large value of D1diff indicates that high-frequency components in the 45°-direction (relative to the horizontal direction as a base) are contained at a large proportion in the frequency domain. Looking at a corresponding image, a fine diagonally-striped pattern rising to the left is observed.

A large value of D2diff indicates that high-frequency components in the 135°-direction (relative to the horizontal direction as a base) are contained at a large proportion in the frequency domain. Looking at a corresponding image, a fine diagonally-striped pattern rising to the right is observed.

Comparing the values of D1diff and D2diff with each other, in FIG. 21, the value of D1diff is dominant in regions (c) and (f) indicated by thin gray, and the value of D2diff is dominant in regions (d) and (e) indicated by dark gray. By determining the correlation direction based on D1diff and D2diff, therefore, the correlation direction can be primarily divided into two, i.e., the diagonal direction rising to the right and the diagonal direction rising to the left.

The processing in the correlation coefficient computing unit 207 using respective output signals of correlation value detecting means in four directions, i.e., Hdiff, Vdiff, D1diff and D2diff, will now be described.

In this processing, the correlation coefficient K is output based on Hdiff and Vdiff. Further, when a value of the correlation coefficient K is other than 1 or −1, a control signal filt_fg based on D1diff and D2diff for controlling an interpolation value synthesis process in the synthesis unit 104c is produced. The process for producing the correlation coefficient and the process for producing the control signal filt_fg will be described with reference to the flowchart of FIG. 22.

Figure 22:
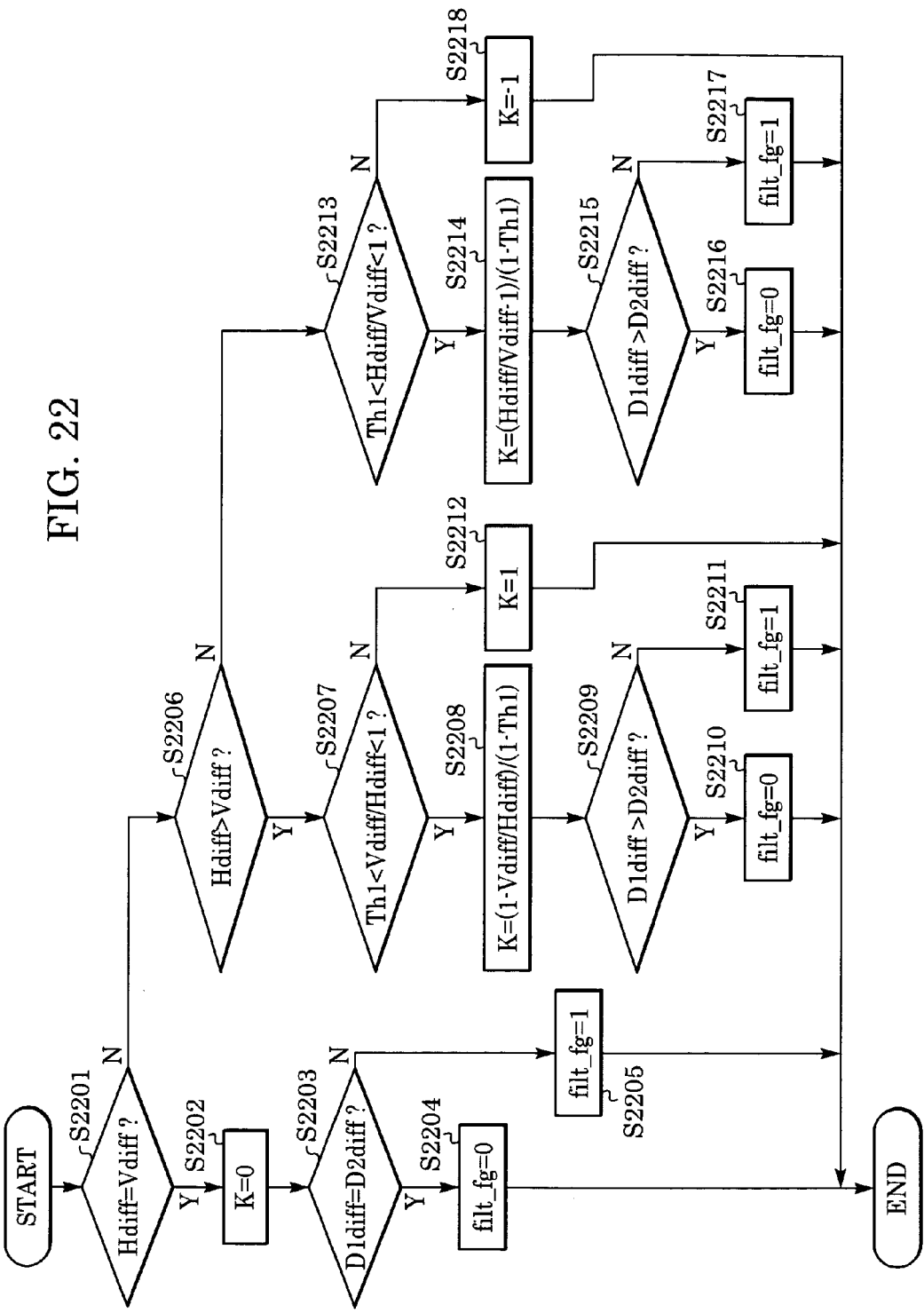
FIG. 22 is a flowchart showing a correlation determining process.

Referring to FIG. 22, respective values of Hdiff and Vdiff are first compared with each other in S2201. Then, if both values are equal, the control flow proceeds to S2202, and if both values differ from each other, flow proceeds to S2206.

In S2202, the correlation coefficient K is set as K=0. Then, it is determined in S2203 which one of D1diff and D2diff is larger. If D1diff is larger, filt_fg is set to 0 (S2204), and if D2diff is larger, filt_fg is set to 1 (S2205).

In S2206, it is determined which one of Hdiff and Vdiff is larger. If Hdiff is larger, the control flow proceeds to S2207, and if Vdiff is larger, it proceeds to S2213.

In S2207, it is determined whether Vdiff/Hdiff is larger than a predetermined threshold Th1 and whether it is smaller than 1. If Vdiff/Hdiff is larger than the threshold Th1 and smaller than 1, the control flow proceeds to S2208, otherwise, K=1 is output (S2212), after which control flow is ended.

In S2208, K is computed from formula (5), above. Then, it is determined in S2209 which one of D1diff and D2diff is larger. If D1diff is larger, filt_fg is set to 0 (S2210), and if D2diff is larger, filt_fg is set to 1 (S2211).

Further, in S2213, it is determined whether Hdiff/Vdiff is larger than the threshold Th1 and whether it is smaller than 1. If Hdiff/Vdiff is larger than the threshold Th1 and smaller than 1, the control flow proceeds to S2214, otherwise, K=−1 is output (S2218), after which control flow is ended.

In S2214, K is computed from the above-mentioned formula (6). Then, it is determined in S2215 which one of D1diff and D2diff is larger. If D1diff is larger, filt_fg is set to 0 (S2216), and if D2diff is larger, filt_fg is set to 1 (S2217).

In such a way, the correlation coefficient K having a value of from −1 to 1 and the control signal filt_fg for use in the synthesis unit 104c is produced.

The processing in the synthesis unit 104c will now be described.

The synthesis unit 104c outputs a final result of the simultaneous interpolation process of the G signals in accordance with the correlation coefficient K and the control signal filt_fg both input from the correlation determining unit 104b.

Figure 23:
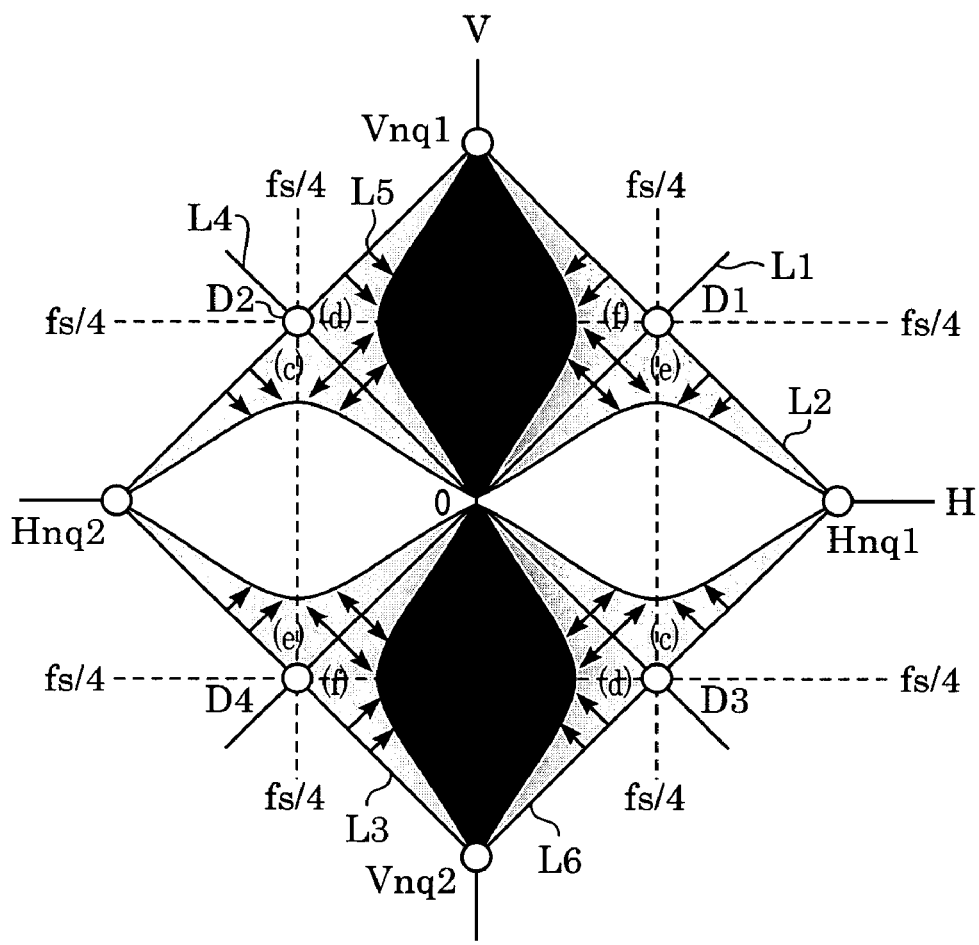
FIG. 23 is a graph showing behaviors of a correlation coefficient and a frequency domain.

FIG. 23 is a graph showing, on a frequency plane, correspondence between the correlation coefficient K, the control signal filt_fg, and the synthesized interpolation value resulting when the CZP chart is the input image. In FIG. 23, a vertical axis V represents a frequency component in the vertical direction, a horizontal axis H represents a frequency component in the horizontal direction, and the origin represents a DC component.

Referring to FIG. 23, on a straight line L1 connecting points D1, D4 where the vertical and horizontal frequency components are each ¼ of the image sampling frequency fs, a straight line L2 connecting points of the vertical and horizontal Nyquist frequency Vnq1, Hnq1, and a straight line L3 connecting points of the vertical and horizontal Nyquist frequency Vnq2, Hnq2, filt_fg is set to 0 and therefore the interpolation value from the 45°-direction interpolation unit 214 is selected by a switch 218. In addition, because the correlation coefficient K is 0, the interpolation value selected by the switch 218 is output as is.

Also, on a straight line L4 connecting points D2, D3 where the vertical and horizontal frequency components are each ¼ of the image sampling frequency fs, a straight line L5 connecting points of the vertical and horizontal Nyquist frequency Vnq1, Hnq2, and a straight line L6 connecting points of the vertical and horizontal Nyquist frequency Vnq2, Hnq1, filt_fg is set to 1 and therefore the interpolation value from the 135°-direction interpolation unit 215 is selected by the switch 218. In addition, because the correlation coefficient K is 0, the interpolation value selected by the switch 218 is output as is.

Further, as shown, in the unshaded region, because of the correlation coefficient K=1, the output of the horizontal interpolation unit 203 is selected by the switch 213 and then output as is. In the darkened, because of the correlation coefficient K=−1, the output of the vertical interpolation unit 202 is selected by the switch 213 and then output as is.

In a region (e), the correlation coefficient K is in the range of 0<K<1 and the control signal filt_fg is 0. In this case, because filt_fg is 0, the interpolation data from the 45°-direction interpolation unit 214 is selected by the switch 218. With computation based on the following formula (7) using the absolute value Ka of the correlation coefficient, a synthesized interpolation value is obtained as an output of the adder 212 and selected by the switch 213 for output:

Synthesized interpolation value=45° interpolation value×(1−*Ka*)+horizontal interpolation value×*Ka* (7)

In a region (c), the correlation coefficient K is in the range of 0<K<1 and the control signal filt_fg is 1. In this case, because filt_fg is 1, the interpolation data from the 135°-direction interpolation unit 215 is selected by the switch 218. With computation based on the following formula (8) using the absolute value Ka of the correlation coefficient, a synthesized interpolation value is obtained as an output of the adder 212 and selected by the switch 213 for output:

Synthesized interpolation value=135° interpolation value×(1−*Ka*)+horizontal interpolation value×*Ka* (8)

In a region (f), the correlation coefficient K is in the range of −1<K<0 and the control signal filt_fg is 0. In this case, because filt_fg is 0, the interpolation data from the 45°-direction interpolation unit 214 is selected by the switch 218. With computation based on the following formula (9) using the absolute value Ka of the correlation coefficient, a synthesized interpolation value is obtained as an output of the adder 211 and selected by the switch 213 for output:

Synthesized interpolation value=45° interpolation value×(1−*Ka*)+vertical interpolation value×*Ka* (9)

In a region (d), the correlation coefficient K is in the range of −1<K<0 and the control signal filt_fg is 1. In this case, because filt_fg is 1, the interpolation data from the 135°-direction interpolation unit 215 is selected by the switch 218. With computation based on the following formula (10) using the absolute value Ka of the correlation coefficient, a synthesized interpolation value is obtained as an output of the adder 211 and selected by the switch 213 for output:

Synthesized interpolation value=135° interpolation value×(1−*Ka*)+vertical interpolation value×*Ka* (10)

Moreover, when the correlation coefficient K is 1, the horizontal interpolation value is output as the final interpolation result, and when the correlation coefficient K is −1, the vertical interpolation value is output as the final interpolation result.

In this embodiment, since the detected results of the 45°- and 135°-direction correlation values are obtained in addition to the detected results of the vertical and horizontal correlation values, and the coefficient depending on the correlation direction is computed in accordance with those detected results of the correlation values, accuracy in the interpolation process suitable for the diagonal direction, which serves as a base in the entire interpolation process.

For example, when the correlation direction changes from 45° toward the horizontal direction, two kinds of interpolation data, namely, the horizontal interpolation data and the interpolation data obtained through a filter weighted in the 45°-direction are subjected to weighted summation such that a proportion of the horizontal interpolation data increases relative to the 45°-direction interpolation data, as a base, depending on a change of the correlation direction. Accordingly, the 45°-direction interpolation data and the horizontal direction interpolation data can smoothly replace each other.

Also, as the correlation in the 45°-direction increases, a proportion of the 45°-direction interpolation data increases. Hence, resolution in appearance in the diagonal direction does not deteriorate.

The above-described advantage can be similarly obtained when the correlation direction changes from the 45°-direction toward the vertical direction and when the correlation direction changes from the 135°-direction toward the horizontal or vertical direction with the 135°-direction interpolation data serving as a base. A Further, in this embodiment, the 45°-direction interpolation data and the 135°-direction interpolation data are replaced depending on the control signal filt_fg. However, either data is synthesized with the horizontal interpolation data or the vertical interpolation data during a transition from the state in which the 45°-direction interpolation data is output as is and the state in which the 135°-direction interpolation data is output as is. Therefore, the final interpolation data moderately changes depending on the correlation direction and unnaturalness is prevented in image quality.

Fourth Embodiment

Figure 28:
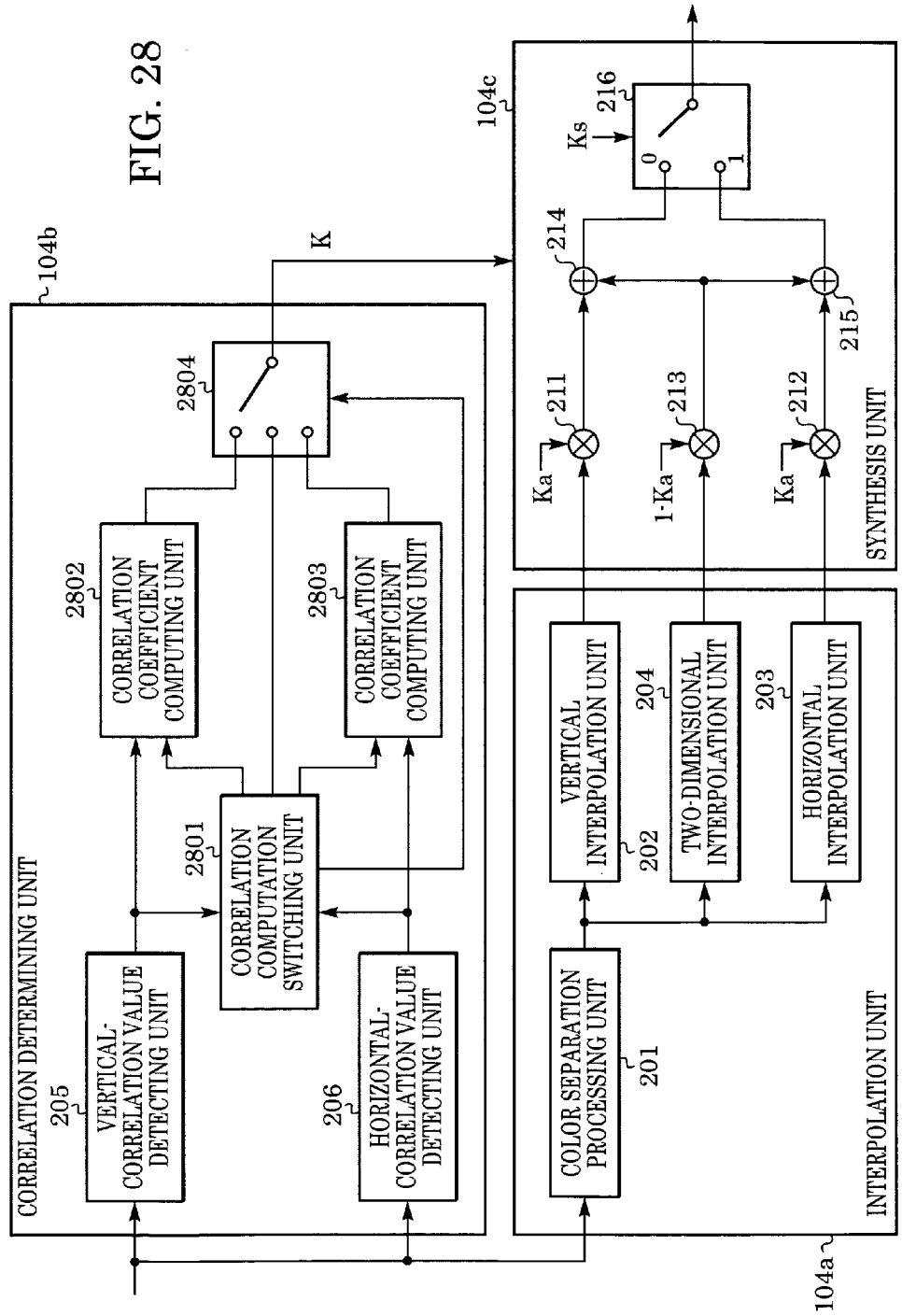
FIG. 28 is a block diagram of an interpolation circuit in accordance with an embodiment of the present invention.

FIG. 28 is a block diagram of an interpolation unit 104a in accordance with a fourth embodiment of the present invention.

In FIG. 28, an interpolation unit 104a and a synthesis unit 104c have the same configuration as those in the first embodiment shown in FIG. 2. The fourth embodiment differs from the first embodiment in the correlation determining unit 104b. Therefore, the following description is made of the correlation determining unit 104b, and the other components are not described here.

The correlation determining unit 104b comprises a vertical correlation value detecting unit 205, a horizontal correlation value detecting unit 206, a correlation computation switching unit 2801, first and second correlation coefficient computing units 2802, 2803, and a switch 2804, thereby producing a correlation coefficient K.

The vertical correlation value detecting unit 205 and the horizontal correlation value detecting unit 206 output, as described above, a vertical correlation value Vdiff and a horizontal correlation value Hdiff, respectively.

Figure 29:
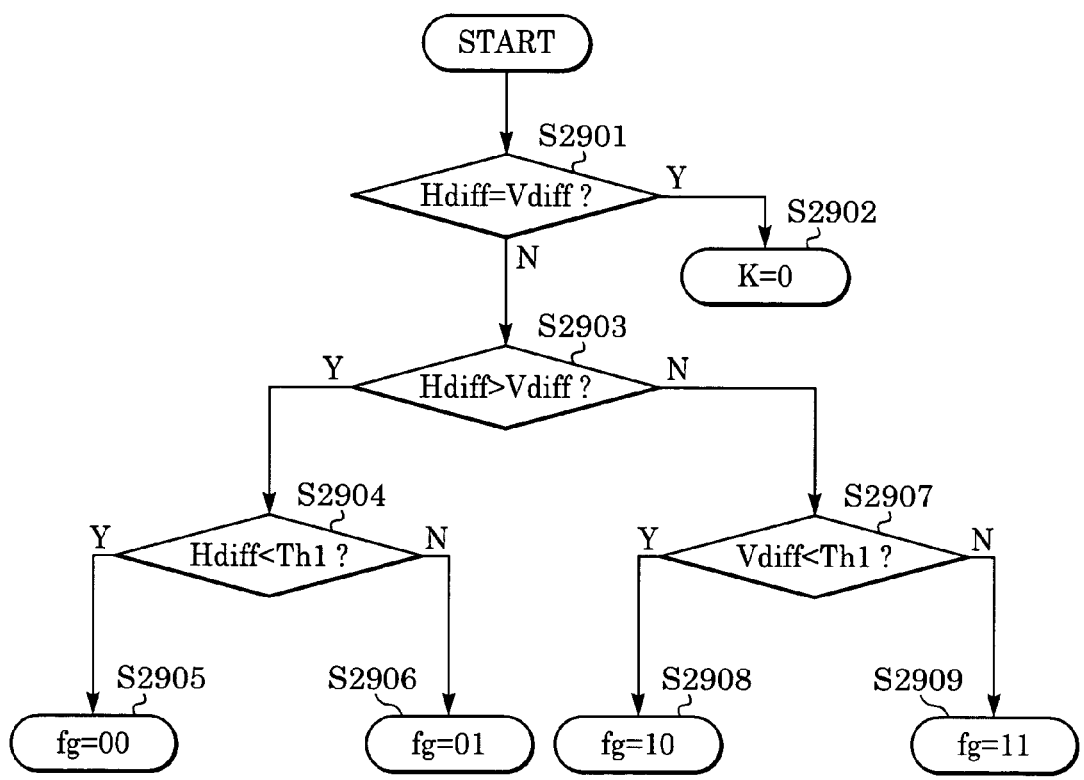
FIG. 29 is a flowchart showing processing executed by a correlation computation switching unit.

Based on the vertical correlation value Vdiff and the horizontal correlation value Hdiff thus computed, the correlation computation switching unit 2801 produces a control signal fg for computing the correlation coefficient K in accordance with the flowchart shown in FIG. 29.

First, it is determined in whether the vertical correlation value Vdiff and the horizontal correlation value Hdiff are equal to each other (S2901). If both values are equal, the correlation coefficient K is set as K=0 and output to the switch 2804 (S2902).

Then, Hdiff and Vdiff are compared with each other (S2903). If Hdiff is larger than Vdiff and Hdiff is smaller than a predetermined threshold Th1 (S2904), the control signal fg is set to 00 and output to the first correlation coefficient computing unit 2802 (S2905). If Hdiff is larger than Vdiff and Hdiff is not smaller than the threshold Th1, fg is set to 01 and output to the second correlation coefficient computing unit 2803 (S2906). Further, if Vdiff is larger than Hdiff and Vdiff is smaller than the threshold Th1 (S2907), fg is set to 10 and output to the first correlation coefficient computing unit 2802 (S2908). If Vdiff is larger than Hdiff and Vdiff is not smaller than the threshold Th1, fg is set to 11 and output to the second correlation coefficient computing unit 2803 (S2909).

Then, the first correlation coefficient computing unit 2802 and the second correlation coefficient computing unit 2803 produce the correlation coefficient K in accordance with the value of the control signal fg output from the correlation computation switching unit 2801.

In this embodiment, the first correlation coefficient computing unit 2802 maintains the correlation coefficient K at 0 for a signal containing a frequency component near the vertical or horizontal Nyquist frequency at which the determination result of the correlation direction tends to fluctuate, thereby preventing false determination of the correlation direction.

Figure 30:
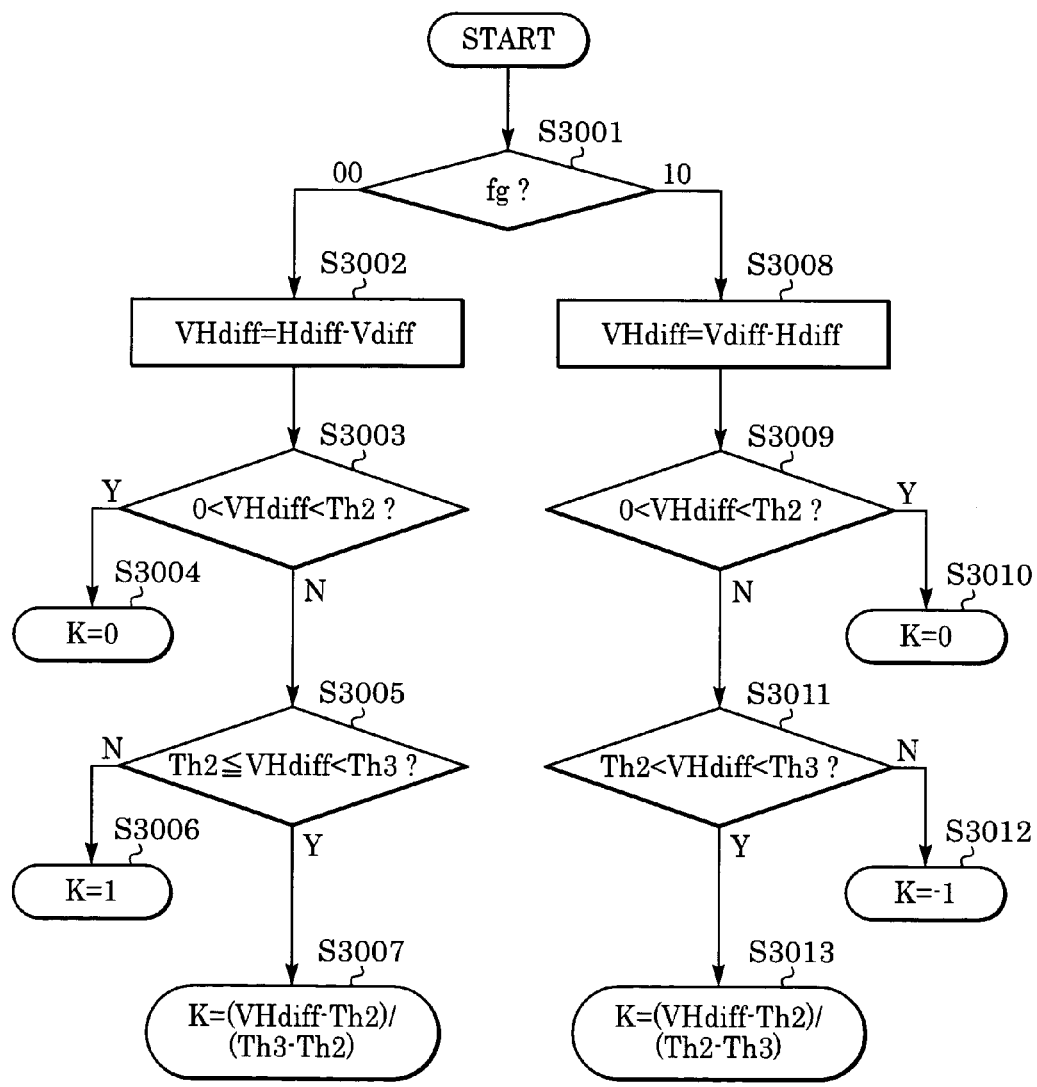
FIG. 30 is a flowchart showing processing executed by a first correlation coefficient computing unit.

More specifically, the first correlation coefficient computing unit 2802 produces the correlation coefficient K by executing processing, shown in the flowchart of FIG. 30, for a signal in a local region where the values of Hdiff and Vdiff slightly differ from each other and the relationship in magnitude between the values of Hdiff and Vdiff differs depending on the pixel position.

In this embodiment, the correlation coefficient K is positive when Hdiff is larger than Vdiff, and takes a negative value when Vdiff is larger. Correspondingly, the process for computing the correlation coefficient is executed separately in two cases by using the control signal fg, i.e., the case in which the correlation coefficient K is a positive value and the case in which it is a negative value.

Referring to FIG. 30, it is determined whether the control signal fg output from the correlation computation switching unit 2801 is 00 or 10 (S3001). If the control signal fg is 00, i.e., if Hdiff is larger than Vdiff, Vdiff is subtracted from Hdiff to obtain a differential value VHdiff (S3002). Then, if the value VHdiff is larger than 0, but smaller than a threshold Th2 (S3003), the correlation coefficient K is forcibly set to 0 (S3004) to prevent false determination of the correlation direction. Also, if the value VHdiff is not smaller than Th2 in S3003, it is determined whether the value VHdiff is smaller than a threshold Th3 (>Th2) (S3005). If the value VHdiff is not smaller than Th3, this indicates that the correlation in the horizontal direction is very high, and the correlation coefficient K is fixed to 1 (S3006). If the value VHdiff is not smaller than Th2, but smaller than Th3, the correlation coefficient K is computed from the following formula (11) such that the correlation coefficient K changes linearly from 0 to 1 in proportion to a differential value between Hdiff and Vdiff (S3007):

$$K=(VHdiff-Th2)/(Th3-Th2) \tag{11}$$

On the other hand, if the control signal fg is 10, i.e., if Vdiff is larger than Hdiff, Hdiff is subtracted from Vdiff to obtain a differential value VHdiff (S3008). Then, if the value of VHdiff is larger than 0, but smaller than the threshold Th2 (S3009), the correlation coefficient K is forcibly set to 0 (S3010) to prevent false determination of the correlation direction. Also, if the value of VHdiff is not smaller than Th2 in S3009, it is determined whether the value of VHdiff is smaller than the threshold Th3 (S3011). If the value of VHdiff is not smaller than Th3, this indicates that the correlation in the vertical direction is very high, and the correlation coefficient K is fixed to 1 (S3012). If the value of VHdiff is not smaller than Th2, but smaller than Th3, the correlation coefficient K is computed from the following formula (12) such that the correlation coefficient K changes linearly from 0 to 1 in proportion to the differential value between Hdiff and Vdiff (S3013):

$$K=(VHdiff-Th2)/(Th2-Th3) \tag{12}$$

The correlation coefficient K thus produced is output to the switch 2804.

Thus, when the control signal fg is 00 or 10, the above-described control process is applied to not only a signal containing a frequency component near the vertical or horizontal Nyquist frequency, but also to a signal containing a frequency component close to the DC component. However, using the correlation coefficient computed by the above-described control process in a region near the DC component causes no adverse effects on the interpolation result.

In the other regions, the correlation coefficient represents the correlation direction in the relevant pixel position between the target pixel and the surrounding pixels, and by employing the correlation coefficient, the correlation result can be synthesized in the synthesis unit 104c in the downstream stage, taking into account the correlation direction.

Figure 31:
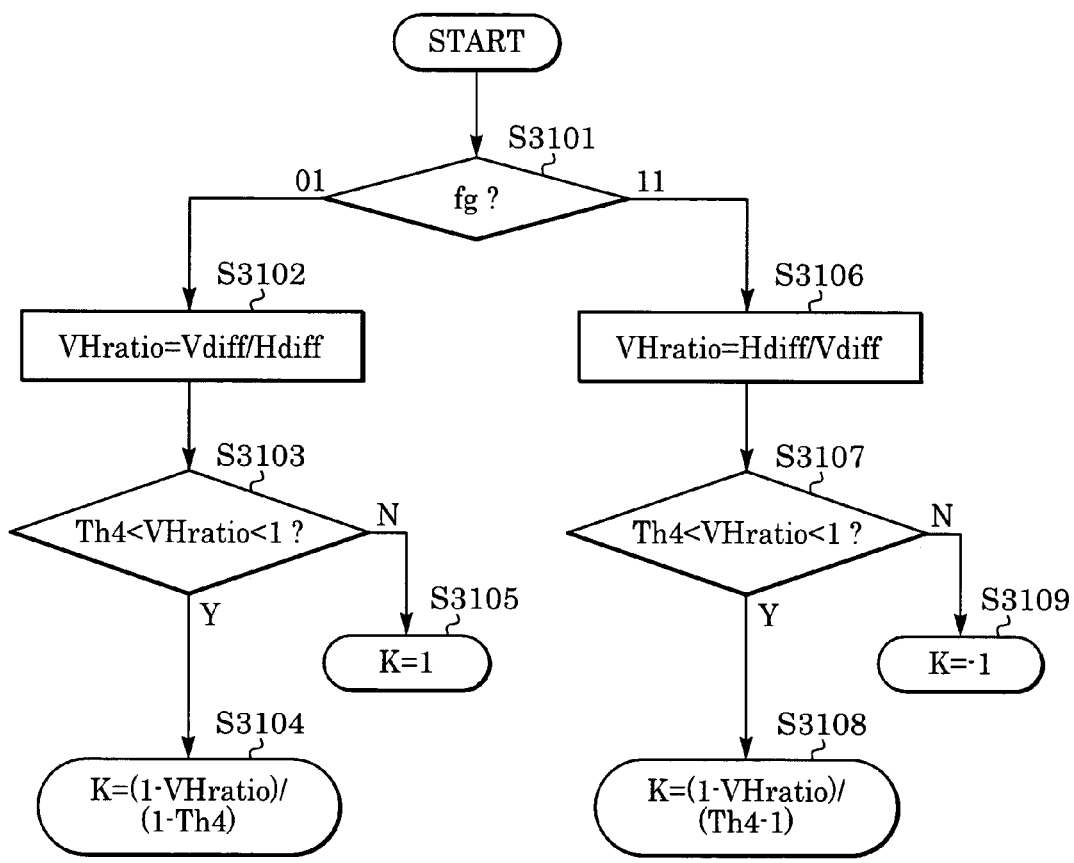
FIG. 31 is a flowchart showing processing executed by a second correlation coefficient computing unit.

The processing in the second correlation coefficient computing unit 2803 will be described below with reference to the flowchart of FIG. 31. In the second correlation coefficient computing unit 2803, the process for computing the correlation coefficient is also executed separately in two cases by using the control signal fg, i.e., the case in which the correlation coefficient K is a positive value and the case in which it is a negative value.

First, it is determined whether the value of fg is 01 or 11 (S3101). If fg is 01, i.e., if Hdiff is larger than Vdiff, Vdiff is divided by Hdiff to obtain VHratio (S3102). Then, it is determined whether the value of VHratio is larger than a threshold Th4 and whether it is smaller than 1 (S3103). If the value of VHratio is between Th4 and 1, the correlation coefficient K is computed from the following formula (13) (S3104), otherwise, the correlation coefficient K is set to 1 (S3105):

$$K=(1-Vdiff/Hdiff)/(1-Th4) \tag{13}$$

If fg is 11, i.e., if Vdiff is larger than Hdiff, Hdiff is divided by Vdiff to obtain VHratio (S3106). Then, it is determined whether the value of VHratio is larger than the threshold Th4 and whether it is smaller than 1 (S3107). If the value of VHratio is between Th4 and 1, the correlation coefficient K is computed from the following formula (14) (S3108), otherwise, the correlation coefficient K is set to 1 (S3109):

$$K=(1-Hdiff/Vdiff)/(Th4-1) \tag{14}$$

In this way, the correlation coefficient K having a value of from −1 to 1 is output to the switch 2804.

The correlation computation switching unit 2801 changes over the switch 2804 in accordance with the value of the control signal fg, to output the correlation coefficient K. More specifically, the switch 210 is controlled so as to select an output of the first correlation coefficient computing unit 2802 when fg is 00 or 10, and to select an output of the second correlation coefficient computing unit 2803 when fg is 10 or 11. Also, the switch 210 is controlled so as to select an output of the correlation computation switching unit 2801 when the vertical correlation value and the horizontal correlation value are equal in S2901 of FIG. 29 and the value of K is set to 0.

Further, the threshold Th1 is a constant expressed by Th1=tan θ (0°≦θ<45°), for example. The processing in the synthesis unit 104c in the downstream stage can be controlled such that higher priority is given to the resolution in appearance in the vertical and horizontal directions by setting Th1 to a larger value, and is given to the resolution in appearance in the diagonal direction by setting Th1 to a smaller value. Accordingly, by adjusting the value of the threshold Th1 in consideration of balance of the resolution in appearance between the vertical and horizontal directions and the diagonal direction, the interpolation process can be satisfactorily performed for any pixel having correlation in any direction.

Figure 32:
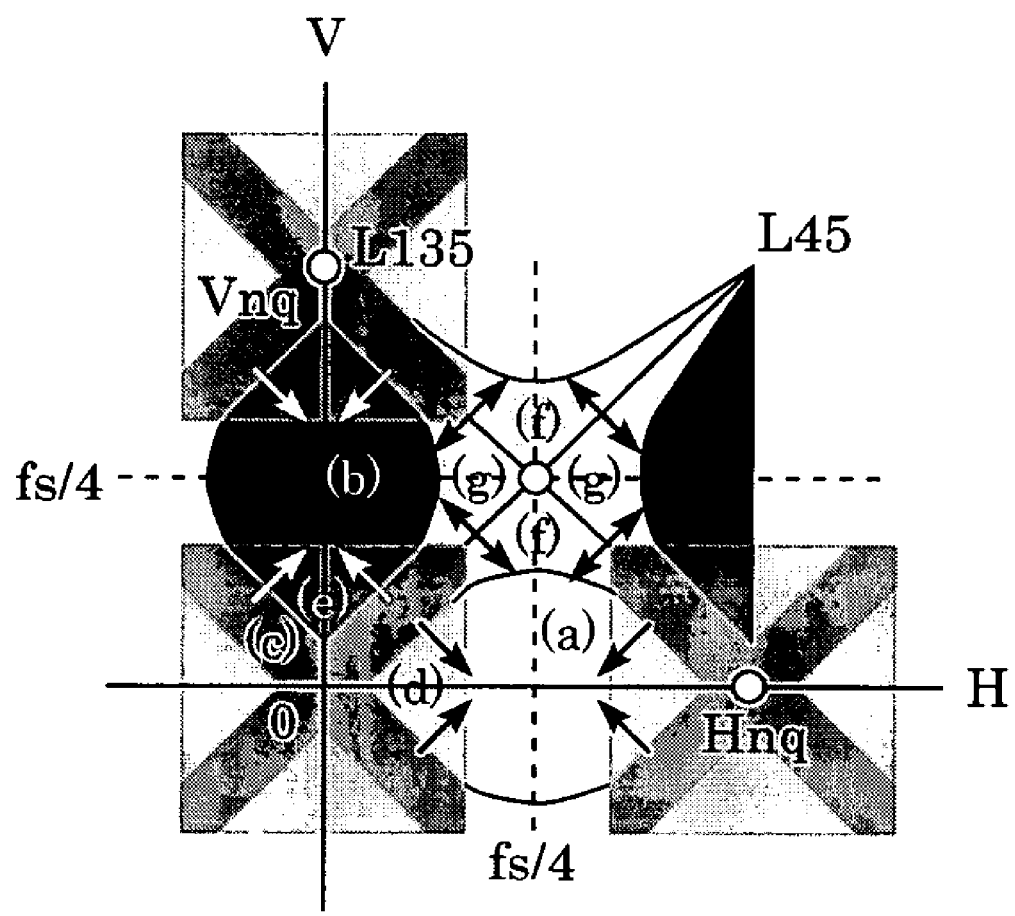
FIG. 32 is a graph showing correspondence between a correlation coefficient K and a frequency component of each pixel when the CZP chart is an input image.

FIG. 32 is a graph showing correspondence between the frequency component of each pixel and the correlation coefficient K. The correlation coefficient K is output from the correlation determining unit 2 resulting when the CZP chart shown in FIG. 9 is the input image. In FIG. 32, a vertical axis V represents a frequency component in the vertical direction, a horizontal axis H represents a frequency component in the horizontal direction, and the origin represents a DC component. FIG. 32 shows only the first quadrant of the frequency plane, taking into account the symmetry of the CZP chart.

More specifically, in FIG. 32, the correlation coefficient K=1 is constant in an unshaded region (a), and the correlation coefficient K=−1 is constant set in a dark region (b).

When the vertical correlation value or the horizontal correlation value is very large, the vertical interpolation process or the horizontal interpolation process can be positively applied in the synthesis unit 104c, whereby the appearance resolution can be improved in both the vertical and horizontal directions.

Also, in a shaded X-shaped region (c) near the vertical Nyquist frequency Vnq, the horizontal Nyquist frequency Hnq and the DC component, a straight line L135 connecting Vnq and Hnq, and a straight line L45 perpendicular to L135, the correlation coefficient K=0 is constant.

Here, the X-shaped region near the vertical and horizontal Nyquist frequency is a dead zone prepared so as not to, whenever a variation occurs in the vertical and horizontal correlation values contained in the signal per pixel position, detect the variation and change the correlation direction. In that region, the interpolation process is performed such that the high-frequency components in both the vertical and horizontal directions are cut off by a two-dimensional low-pass filter.

Furthermore, in the unshaded region (a) and the dark region (b) close respectively to the dead (shaded) zone (c) in the horizontal and vertical directions, the interpolation process in the horizontal direction and the interpolation process in the vertical direction are executed, respectively, as described above. In regions (d) and (e) interposed between the regions (a), (b) and the dead zone (c), however, the correlation coefficient K changes linearly from 0 to 1 and from 0 to −1, respectively. As a result, a change of the interpolation process upon transition to the dead zone (c) does not cause discontinuity.

In a region (f) near an intersect between a vertical line representing the frequency fs/4 and a horizontal line representing the frequency fs/4, the correlation coefficient K indicating the correlation direction, which is produced when fg is 01 or 11, has a value of from K=0 to K=1 distributed in the directions of arrows to gradually change from the diagonal lines L45, L135 toward the unshaded region (a).

Likewise, in a region (g) near the above-mentioned intersect, the correlation coefficient K has a value of from K=0 to K=−1 distributed in the directions of arrows to gradually change from the diagonal lines L45, L135 toward the dark region.

Therefore, the synthesized result of the output from the interpolation process in the diagonal direction and the output from the horizontal or vertical interpolation process changes moderately in the synthesis unit 104c, and no unnaturalness occurs in image quality.

Finally, the signal processing in synthesis unit 104c will now be described.

In the synthesis unit 104c, two of the three interpolation values output from the interpolation unit 104a are selected in accordance with the correlation coefficient K output from the correlation determining unit 104b. Then, a weighted average of the selected two interpolation values is calculated with the correlation coefficient K used as a mixing ratio, and is output as a final result of the simultaneous interpolation process of the G signals.

With this embodiment, the correlation coefficient produced when the control signal fg is 00 or 10 and the correlation coefficient produced when the control signal fg is 01 or 11 are not separated from each other and are handled as one variable having a value between −1 to 1 so that the interpolation value synthesis process can be performed without making the transition of the correlation coefficient perceptible. Also, by adjusting characteristics of the interpolation filters used in the respective interpolation units 202 to 204 of the interpolation unit 104a, the final image quality remains high even when two interpolation values are synthesized provided that the correlation coefficients computed by two different methods serve as one variable.

Thus, according to this embodiment, variation in image quality can be reduced even when the target pixel to be interpolated has a frequency component near the Nyquist frequency.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   an input device adapted to input an image signal obtained with offset sampling per pixel;
   a correlation detecting device adapted to detect, based on the input image signal, degrees of correlation in horizontal and vertical directions for a target pixel to be interpolated, and to obtain correlation values representing the detected correlation degrees;
   a coefficient producing device adapted to produce a coefficient based on the correlation value in the horizontal direction and the correlation value in the vertical direction obtained by the correlation detecting device;
   an interpolation device adapted to produce an interpolation image signal in accordance with the coefficient produced by the coefficient producing device, and interpolate the image signal input from the input device by using the interpolation image signal, wherein the coefficient producing device produces the coefficient based on a differential between the correlation value in the horizontal direction and the correlation value in the vertical direction when both the correlation value in the horizontal direction and the correlation value in the vertical direction are smaller than a first threshold value, and produces the coefficient based on a ratio of the correlation value in the horizontal direction to the correlation value in the vertical direction when at least one of the correlation value in the horizontal direction and the correlation value in the vertical direction is not smaller than the first threshold value.

2. An image processing apparatus according to claim 1,
wherein the interpolation device produces the interpolation image signal by adding, based on the coefficient produced by the coefficient producing device, a first value obtained from an output value of a pixel positioned in the horizontal direction of the target pixel or an output value of a pixel positioned in the vertical direction of the target pixel, to a second value obtained from an output value of pixels positioned in the horizontal and vertical directions of the target pixel,
wherein the coefficient producing device produces a coefficient when both the correlation values in the horizontal and vertical directions are smaller than the first threshold value and when a differential between the correlation values in the horizontal and vertical directions is not smaller than a second threshold value but smaller than a third threshold value, based on the differential, and
wherein the coefficient producing device produces a coefficient for setting one of the first value and the second value to zero, when both the correlation value in the horizontal direction and the correlation value in the vertical direction are smaller than the first threshold value and the differential between the correlation value in the horizontal direction and the correlation value in the vertical direction is smaller than the second threshold value, or when both the correlation value in the horizontal direction and the correlation value in the vertical direction are smaller than the first threshold value and the differential between the correlation value in the horizontal direction and the correlation value in the vertical direction are not smaller than the third threshold value.

3. An image processing apparatus according to claim 1,
wherein the interpolation device produces the interpolation image signal by adding, based on the coefficient produced by the coefficient producing device, a first value obtained from an output value of a pixel positioned in the horizontal direction of the target pixel or an output value of a pixel positioned in the vertical direction of the target pixel, to a second value obtained from an output value of pixels positioned in the horizontal and vertical directions of the target pixel,
wherein the coefficient producing device produces a coefficient when one of the correlation value in the horizontal direction and the correlation value in the vertical direction is not smaller than the first threshold value and ratio of the correlation value in the horizontal direction to the correlation value in the vertical direction is not smaller than a fourth threshold value, based on the ratio, and
wherein the coefficient producing device produces a coefficient for setting the second value to zero when added by the interpolation device, when one of the correlation value in the horizontal direction and the correlation value in the vertical direction is not smaller than the first threshold value and when ratio of the correlation value in the horizontal direction to the correlation value in the vertical direction is smaller than the fourth threshold value.

4. An image processing method comprising:
inputting an image signal obtained with offset sampling per pixel;
detecting, based on the input image signal, degrees of correlation in horizontal and vertical directions for a target pixel to be interpolated;
obtaining correlation values representing the detected correlation degrees;
producing a coefficient based on the correlation value in the horizontal direction and the correlation value in the vertical direction;
producing an interpolation image signal in accordance with the coefficient produced; and
interpolating the image signal input by using the interpolation image signal,
wherein the coefficient is produced based on a differential between the correlation value in the horizontal direction and the correlation value in the vertical direction when both the correlation value in the horizontal direction and the correlation value in the vertical direction are smaller than a first threshold value, and produces the coefficient based on ratio of the correlation value in the horizontal direction to the correlation value in the vertical direction when one of the correlation value in the horizontal direction and the correlation value in the vertical direction is not smaller than the first threshold value.

* * * * *